US012342310B2

United States Patent
Raghavan et al.

(10) Patent No.: US 12,342,310 B2
(45) Date of Patent: Jun. 24, 2025

(54) DEVICE REGION ESTIMATION FOR NEAR-FIELD OPERATION

(71) Applicant: QUALCOMM Incorporated, San Diego, CA (US)

(72) Inventors: Vasanthan Raghavan, West Windsor Township, NJ (US); Junyi Li, Fairless Hills, PA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 17/712,790

(22) Filed: Apr. 4, 2022

(65) Prior Publication Data

US 2023/0319760 A1    Oct. 5, 2023

(51) Int. Cl.
*H04W 64/00* (2009.01)
*H04B 17/318* (2015.01)
*H04W 16/28* (2009.01)

(52) U.S. Cl.
CPC .......... *H04W 64/00* (2013.01); *H04B 17/318* (2015.01); *H04W 16/28* (2013.01)

(58) Field of Classification Search
CPC ....... H04W 64/00; H04W 16/28; H04W 4/80; H04W 24/08; H04W 24/10; H04B 17/318; H04B 7/0695; H04B 7/06952; H04B 7/0408; H04B 7/0682; H04B 17/328; H04L 5/0048
See application file for complete search history.

(56) References Cited

U.S. PATENT DOCUMENTS

| 11,817,914 | B2 | 11/2023 | Raghavan et al. | |
| 2018/0337738 | A1* | 11/2018 | Wen | H04B 17/309 |
| 2019/0238287 | A1* | 8/2019 | Zhou | H04B 7/0626 |
| 2019/0386733 | A1* | 12/2019 | Nilsson | H04L 5/0048 |
| 2020/0007197 | A1* | 1/2020 | Kang | H04L 5/0048 |

(Continued)

FOREIGN PATENT DOCUMENTS

| WO | WO-2021186720 A1 | 9/2021 |
| WO | WO-2022032485 A1 | 2/2022 |

OTHER PUBLICATIONS

Partial International Search Report—PCT/US2023/015358—ISA/EPO—Jun. 14, 2023.

(Continued)

*Primary Examiner* — Kenneth T Lam
(74) *Attorney, Agent, or Firm* — Holland & Hart LLP

(57) ABSTRACT

Methods, systems, and devices for wireless communications are described. Generally, the described techniques provide for efficiently determining a region in which a user equipment (UE) is located. The UE may perform measurements on reference signals received from a first network entity to determine the region in which the UE is located. In some cases, the UE may provide the measurements or other information to a second network entity, and the second network entity may indicate the region in which the UE is located to the UE based on the measurements or the other information. The second network entity or the UE may also indicate the region in which the UE is located to the first network entity. The UE and the first network entity may then select suitable beams for communicating based on the region in which the UE is located.

23 Claims, 18 Drawing Sheets

(56) References Cited

U.S. PATENT DOCUMENTS

| | | | |
|---|---|---|---|
| 2020/0007205 A1* | 1/2020 | Park | H04B 7/0469 |
| 2020/0145977 A1 | 5/2020 | Kumar et al. | |
| 2020/0163101 A1* | 5/2020 | Caretti | H04W 16/28 |
| 2022/0069960 A1 | 3/2022 | Bao | |
| 2022/0116790 A1* | 4/2022 | Firouzbakht | H01Q 5/307 |
| 2022/0338024 A1* | 10/2022 | Barker | H04B 1/0064 |
| 2022/0345908 A1* | 10/2022 | Takano | H04W 16/28 |
| 2023/0064052 A1* | 3/2023 | Moon | H04W 56/001 |
| 2023/0066605 A1 | 3/2023 | Zhang et al. | |
| 2023/0135259 A1 | 5/2023 | Kurita et al. | |
| 2024/0031012 A1* | 1/2024 | Yang | H04B 7/1851 |
| 2024/0072964 A1* | 2/2024 | Nilsson | H04L 5/0048 |
| 2024/0348293 A1 | 10/2024 | Zhang et al. | |

OTHER PUBLICATIONS

International Search Report and Written Opinion—PCT/US2023/015358—ISA/EPO—Aug. 4, 2023.

* cited by examiner

DEVICE REGION ESTIMATION FOR NEAR-FIELD OPERATION

FIELD OF TECHNOLOGY

The present disclosure relates to wireless communications, including device region estimation for near-field operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities, each supporting wireless communication for communication devices, which may be known as user equipment (UE). In some wireless communications systems, a UE may communicate with a network entity using one or more beams (e.g., using beamforming). In such systems, the UE and the network entity may perform beam selection to select the best beams or most suitable beams for communicating with each other. Beam selection may account for the angle of the UE relative to the network entity such that the network entity may be able to direct downlink transmissions to the UE and the UE may be able to direct uplink transmissions to the network entity. In some cases, however, one or more UEs in a wireless communications system may communicate with the network entity from different positions within a coverage area of the network entity. In such cases, factors other than an angle of a UE relative to a network entity may affect the best beams for communications between the UE and the network entity. Improved techniques for beam selection may be desirable.

SUMMARY

The described techniques relate to improved methods, systems, devices, and apparatuses that support device region estimation for near-field operation. Generally, the described techniques provide for efficiently determining a region in which a user equipment (UE) is located and selecting beams (e.g., beam weights) for communications based on the region in which the UE is located. In some examples, the UE may be in a near-field region or a far-field region of a first network entity. The UE may perform measurements on reference signals received from the first network entity and may determine the region in which the UE is located based on the measurements. In some cases, the UE may provide the measurements or other information to a second network entity (e.g., server that collects data for network optimization), and the second network entity may indicate to the UE the region in which the UE is located based on the measurements or the other information. Further, the second network entity or the UE may also indicate to the first network entity the region in which the UE is located. The UE and the first network entity may then select suitable beam weights for communicating based on the region in which the UE is located.

A method for wireless communication at a user equipment (UE) is described. The method may include receiving reference signals from a first network entity on one or more beams at the UE, performing one or more measurements on the reference signals, determining a region in which the UE is located relative to the first network entity based on performing the one or more measurements, and selecting a beam for communicating with the first network entity based on the region in which the UE is located.

An apparatus for wireless communication at a UE is described. The apparatus may include a processor, memory coupled with the processor, and instructions stored in the memory. The instructions may be executable by the processor to cause the apparatus to receive reference signals from a first network entity on one or more beams at the UE, perform one or more measurements on the reference signals, determine a region in which the UE is located relative to the first network entity based on performing the one or more measurements, and select a beam for communicating with the first network entity based on the region in which the UE is located.

Another apparatus for wireless communication at a UE is described. The apparatus may include means for receiving reference signals from a first network entity on one or more beams at the UE, means for performing one or more measurements on the reference signals, means for determining a region in which the UE is located relative to the first network entity based on performing the one or more measurements, and means for selecting a beam for communicating with the first network entity based on the region in which the UE is located.

A non-transitory computer-readable medium storing code for wireless communication at a UE is described. The code may include instructions executable by a processor to receive reference signals from a first network entity on one or more beams at the UE, perform one or more measurements on the reference signals, determine a region in which the UE is located relative to the first network entity based on performing the one or more measurements, and select a beam for communicating with the first network entity based on the region in which the UE is located.

Some examples of the method, apparatuses, and non-transitory computer-readable medium described herein may further include operations, features, means, or instructions for reporting, to a second network entity, the one or more measurements performed on the reference signals and receiving, from the second network entity, an indication of the region in which the UE may be located relative to the first network entity based on reporting the one or more measurements.

In some examples of the method, apparatuses, and non-transitory computer-readable medium described herein, reporting the one or more measurements may include operations, features, means, or instructions for reporting, to the second network entity, an identifier of a beam at the UE associated with one or more highest signal strength measurements and an indication of the signal strength measurements, where receiving the indication of the region in which the UE may be located relative to the first network entity may be based on reporting the identifier of the beam and the indication of the signal strength measurements.

In some examples of the method, apparatuses, and non-transitory computer-readable medium described herein, reporting the one or more measurements may include operations, features, means, or instructions for reporting, to the second network entity, a location of the UE, where receiving the indication of the region in which the UE may be located relative to the first network entity may be based on reporting the location of the UE.

In some examples of the method, apparatuses, and non-transitory computer-readable medium described herein, reporting the one or more measurements may include operations, features, means, or instructions for reporting, to the second network entity, a quality of a line-of-sight path between the UE and the first network entity, where receiving the indication of the region in which the UE may be located relative to the first network entity may be based on reporting the quality of the line-of-sight path.

Some examples of the method, apparatuses, and non-transitory computer-readable medium described herein may further include operations, features, means, or instructions for comparing a first signal strength of a first reference signal of the reference signals received from the first network entity and a second signal strength of a second reference signal of the reference signals received from the first network entity, the first reference signal having a first polarization and the second reference signal having a second polarization and determining the quality of the line-of-sight path between the UE and the first network entity based on the comparing.

Some examples of the method, apparatuses, and non-transitory computer-readable medium described herein may further include operations, features, means, or instructions for comparing a first signal strength of a first polarization of a reference signal of the reference signals received from the first network entity and a second signal strength of a second polarization of the reference signal and determining the quality of the line-of-sight path between the UE and the first network entity based on the comparing.

In some examples of the method, apparatuses, and non-transitory computer-readable medium described herein, performing the one or more measurements on the reference signals may include operations, features, means, or instructions for performing reference signal received power measurements on the reference signals received on a single beam at the UE, and where determining the region in which the UE may be located relative to the first network entity includes and determining the region in which the UE may be located relative to the first network entity based on the reference signal received power measurements.

In some examples of the method, apparatuses, and non-transitory computer-readable medium described herein, determining the region in which the UE may be located relative to the first network entity may include operations, features, means, or instructions for determining the region in which the UE may be located relative to the first network entity based on the reference signal received power measurements, a power with which the reference signals may be transmitted from a power amplifier, an elemental gain at a transmit antenna element used to transmit the reference signals, a first quantity of antenna elements at a transmit antenna array, a second quantity of antenna elements at a receive antenna array, and an estimated path loss exponent for a communications link between the first network entity and the UE.

In some examples of the method, apparatuses, and non-transitory computer-readable medium described herein, determining the region in which the UE may be located relative to the first network entity may include operations, features, means, or instructions for reporting the reference signal received power measurements to a second network entity and receiving, from the second network entity, an indication of the region in which the UE may be located relative to the first network entity based on reporting the reference signal received power measurements.

In some examples of the method, apparatuses, and non-transitory computer-readable medium described herein, performing the one or more measurements on the reference signals may include operations, features, means, or instructions for performing first reference signal received power measurements on the reference signals received on a first beam at the UE and second reference signal received power measurements on the reference signals received on a second beam at the UE, and where determining the region in which the UE may be located relative to the first network entity includes and determining the region in which the UE may be located relative to the first network entity based on the first reference signal received power measurements and the second reference signal received power measurements.

In some examples of the method, apparatuses, and non-transitory computer-readable medium described herein, determining the region in which the UE may be located relative to the first network entity may include operations, features, means, or instructions for reporting the first reference signal received power measurements and the second reference signal received power measurements to a second network entity and receiving, from the second network entity, an indication of the region in which the UE may be located relative to the first network entity based on reporting the first and second reference signal received power measurements.

Some examples of the method, apparatuses, and non-transitory computer-readable medium described herein may further include operations, features, means, or instructions for receiving a first set of the reference signals from the first network entity using a first set of beam weights and a second set of the reference signals from the first network entity using a second set of beam weights and determining the region in which the UE may be located relative to the first network entity based on a phase difference between the first set of the reference signals and the second set of the reference signals.

Some examples of the method, apparatuses, and non-transitory computer-readable medium described herein may further include operations, features, means, or instructions for reporting, to a second network entity, the phase difference between the first set of the reference signals received using the first set of beam weights and the second set of the reference signals received using the second set of beam weights and receiving, from the second network entity, an indication of the region in which the UE may be located relative to the first network entity based on reporting the phase difference.

In some examples of the method, apparatuses, and non-transitory computer-readable medium described herein, the determining the region in which the UE may be located relative to the first network entity may be further based on parameters of a transmit antenna array at the first network entity used to transmit the first set of reference signals and the second set of reference signals.

In some examples of the method, apparatuses, and non-transitory computer-readable medium described herein, selecting the beam for communicating with the first network entity may include operations, features, means, or instructions for identifying an analog or hybrid beamforming codebook from which to select the beam for communicating with the first network entity based on the determined region in which the UE may be located relative to the first network entity and selecting the beam for communicating with the first network entity from the analog or hybrid beamforming codebook.

In some examples of the method, apparatuses, and non-transitory computer-readable medium described herein, determining the region in which the UE may be located relative to the first network entity may include operations, features, means, or instructions for determining whether the UE may be in a near-field region or a far-field region of the first network entity.

In some examples of the method, apparatuses, and non-transitory computer-readable medium described herein, the far-field region of the first network entity may be a region beyond a Fraunhofer distance of the first network entity.

A method for wireless communication at a first network entity is described. The method may include identifying an algorithm for correlating measurements performed by user equipment (UEs) with distances of the UEs from a second network entity, receiving, from a UE, an indication of one or more measurements performed by the UE on reference signals received by the UE from the second network entity, determining a region in which the UE is located relative to the second network entity using the one or more measurements received from the UE and the identified algorithm, and transmitting, to the UE, an indication of the region in which the UE is located relative to the second network entity based on the determining.

An apparatus for wireless communication at a first network entity is described. The apparatus may include a processor, memory coupled with the processor, and instructions stored in the memory. The instructions may be executable by the processor to cause the apparatus to identify an algorithm for correlating measurements performed by user equipment (UEs) with distances of the UEs from a second network entity, receive, from a UE, an indication of one or more measurements performed by the UE on reference signals received by the UE from the second network entity, determine a region in which the UE is located relative to the second network entity using the one or more measurements received from the UE and the identified algorithm, and transmit, to the UE, an indication of the region in which the UE is located relative to the second network entity based on the determining.

Another apparatus for wireless communication at a first network entity is described. The apparatus may include means for identifying an algorithm for correlating measurements performed by user equipment (UEs) with distances of the UEs from a second network entity, means for receiving, from a UE, an indication of one or more measurements performed by the UE on reference signals received by the UE from the second network entity, means for determining a region in which the UE is located relative to the second network entity using the one or more measurements received from the UE and the identified algorithm, and means for transmitting, to the UE, an indication of the region in which the UE is located relative to the second network entity based on the determining.

A non-transitory computer-readable medium storing code for wireless communication at a first network entity is described. The code may include instructions executable by a processor to identify an algorithm for correlating measurements performed by user equipment (UEs) with distances of the UEs from a second network entity, receive, from a UE, an indication of one or more measurements performed by the UE on reference signals received by the UE from the second network entity, determine a region in which the UE is located relative to the second network entity using the one or more measurements received from the UE and the identified algorithm, and transmit, to the UE, an indication of the region in which the UE is located relative to the second network entity based on the determining.

In some examples of the method, apparatuses, and non-transitory computer-readable medium described herein, receiving the indication of the one or more measurements from the UE may include operations, features, means, or instructions for receiving, from the UE, an identifier of a beam associated with one or more highest signal strength measurements at the UE and an indication of the signal strength measurements, where transmitting the indication of the region in which the UE may be located relative to the second network entity may be based on receiving the identifier of the beam and the indication of the signal strength measurements.

In some examples of the method, apparatuses, and non-transitory computer-readable medium described herein, receiving the indication of the one or more measurements from the UE may include operations, features, means, or instructions for receiving, from the UE, an indication of a location of the UE, where transmitting the indication of the region in which the UE may be located relative to the second network entity may be based on receiving the indication of the location of the UE.

In some examples of the method, apparatuses, and non-transitory computer-readable medium described herein, receiving the indication of the one or more measurements from the UE may include operations, features, means, or instructions for receiving an indication of a quality of a line-of-sight path between the UE and the second network entity, where transmitting the indication of the region in which the UE may be located relative to the second network entity may be based on receiving the indication of the quality of the line-of-sight path.

In some examples of the method, apparatuses, and non-transitory computer-readable medium described herein, determining the region in which the UE may be located relative to the second network entity may include operations, features, means, or instructions for determining the region in which the UE may be located relative to the second network entity based on the reference signal received power measurements, the power with which the reference signals may be transmitted from the power amplifier, an elemental gain at a transmit antenna element used at the second network entity to transmit the reference signals, a first quantity of antenna elements at a transmit antenna array at the second network entity, a second quantity of antenna elements at a receive antenna array at the UE, and an estimated path loss exponent for a communications link between the second network entity and the UE.

In some examples of the method, apparatuses, and non-transitory computer-readable medium described herein, determining the region in which the UE may be located relative to the second network entity may include operations, features, means, or instructions for determining the region in which the UE may be located relative to the second network entity based on the first reference signal received power measurements and the second reference signal received power measurements.

In some examples of the method, apparatuses, and non-transitory computer-readable medium described herein, the one or more measurements received from the UE includes a phase difference between a first set of the reference signals received by the UE, and transmitted by the second network entity using a second set of beam weights, and where determining the region in which the UE may be located relative to the second network entity may include operations, features, means, or instructions for determining the region in which the UE may be located relative to the second network entity based on the phase difference between the first set of the reference signals and the second set of the reference signals.

In some examples of the method, apparatuses, and non-transitory computer-readable medium described herein, the determining the region in which the UE may be located relative to the second network entity may be further based on parameters of a transmit antenna array at the second network entity used to transmit the first set of reference signals and the second set of reference signals.

In some examples of the method, apparatuses, and non-transitory computer-readable medium described herein, determining the region in which the UE may be located relative to the second network entity may include operations, features, means, or instructions for determining whether the UE may be in a near-field region or a far-field region of the second network entity.

In some examples of the method, apparatuses, and non-transitory computer-readable medium described herein, the far-field region of the second network entity may be a region beyond a Fraunhofer distance of the second network entity.

DETAILED DESCRIPTION

Figure 1:
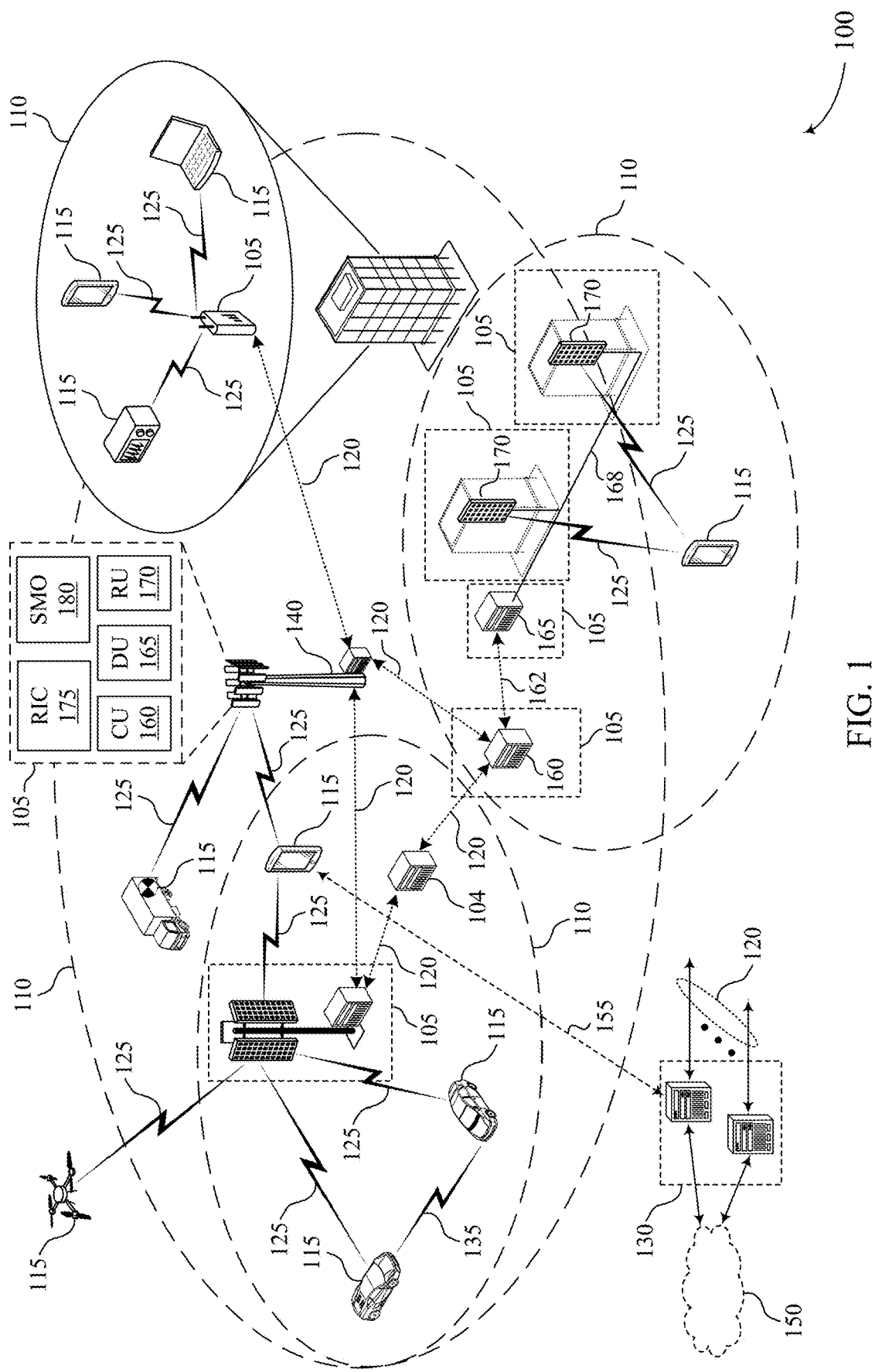
FIG. 1 illustrates an example of a wireless communications system that supports device region estimation for near-field operation in accordance with one or more aspects of the present disclosure.

In some wireless communications systems, a user equipment (UE) may communicate with a network entity using one or more beam weights or beams (e.g., using beamforming). In such systems, the UE and the network entity may perform beam selection to select the best beams or most suitable beams for communicating with each other. Beam selection may be typically of a directional nature and may account for the angle of the UE relative to the network entity such that the network entity may be able to direct downlink transmissions to the UE and the UE may be able to direct uplink transmissions to the network entity. In some cases, however, one or more UEs in a wireless communications system may communicate with the network entity from different positions within a coverage area of the network entity. In such cases, factors other than an angle of a UE relative to a network entity may affect the best beams for communications between the UE and the network entity.

As an example, when a UE is within a given range of a network entity, the distance of the UE from the network entity may affect beamforming between the UE and the network entity. During beam selection, a transmitting device may assume that a distance between a receiving device and each antenna element at a transmit antenna of the transmitting device is the same. That is, the transmitting device may assume that a difference between distances between the receiving device and different antenna elements is negligible. The transmitting device may then use this assumption to identify weights for each antenna element during beam selection. However, as the receiving device moves closer to the transmitting device, the difference between distances between the receiving device and different antenna elements at the transmitting device may become non-negligible, and beam selection performed based on an assumption that the difference is negligible may lead to distorted communications.

As such, it may be appropriate for a UE and a network entity to select beams from different beamforming codebooks depending on a distance between the UE and the network entity. For instance, the UE and the network entity may be configured with different codebooks for near-field operation and far-field operation. Near-field operation may refer to communications between a UE and a network entity when the UE is in a near-field of the network entity. Alternatively, far-field operation may refer to communications between a UE and a network entity when the UE is in a far-field of the network entity. A far-field distance for a transmitting device may be defined as a Fraunhofer distance and may be given by $2D^2/\lambda$, where D is the largest dimension of a transmit antenna array at the transmitting device over any axis assuming a planar array, and $\lambda$ is the wavelength of transmissions. In some cases, however, it may be challenging for a UE and a network entity to determine a distance between the UE and the network entity or a region in which the UE is located.

As described herein, a wireless communications system may support efficient techniques for device region estimation for near-field operation. Generally, the described techniques provide for efficiently determining a region in which a UE is located and performing beam selection based on the region in which the UE is located. In some examples, the UE may be in a near-field region or a far-field region of a first network entity. The UE may perform measurements on reference signals received from the first network entity and may determine the region in which the UE is located based on the measurements. In some cases, the UE may provide the measurements or other information to a second network entity (e.g., server), and the second network entity may indicate to the UE the region in which the UE is located based on the measurements or the other information. Further, the second network entity or the UE may also indicate to the first network entity the region in which the UE is located. The UE and the first network entity may then select suitable beams for communicating based on the region in which the UE is located.

Aspects of the disclosure are initially described in the context of wireless communications systems. Examples of processes and signaling exchanges that support device region estimation for near-field operation are then described. Aspects of the disclosure are further illustrated by and described with reference to apparatus diagrams, system diagrams, and flowcharts that relate to device region estimation for near-field operation.

FIG. 1 illustrates an example of a wireless communications system 100 that supports device region estimation for near-field operation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support device region estimation for near-field operation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

Wireless devices in the wireless communications system 100 may use multi-antenna beamforming to communicate (e.g., in an FR2 or mmW system). A far-field distance for a transmit device in wireless communications system 100 may typically be defined as a Fraunhofer distance. The Fraunhofer distance is given by $2D^2/\lambda$, where D is the largest dimension of a transmit antenna array at the transmitting device (e.g., D=Nd, where d is an inter-antenna element spacing for a linear array, and N is a size of the array) and $\lambda$ is the wavelength of transmissions. Thus, the far-field distance increases quadratically in array size and linearly in frequency. For large arrays and higher carrier frequencies, the far-field distance may be meaningfully large. For example, the far-field distance may be 20.48 m and 41.96 m with a 64×1 array at 30 GHz and 60 GHz, respectively.

As a receive device gets closer to a transmit device, the receive device may enter a near field of the transmit device, and common assumptions in some beamforming designs may start failing. In one example, directional or hierarchical beamforming designs for transmit and receive devices may assume that the receive device is in a far field of the transmit device. In some cases, hybrid or analog beamforming codebook designs may partition regions in space (i.e., for devices in different regions). For instance, a codebook design for beam selection may include a first set of beams for communications between a transmit device and a receive device in a near field and a second set of beams for communications between a transmit device and a receive device in a far field. In a near field, an electric field may scale according to $1/r^2$ or $1/r^3$ (e.g., depending on a distance r between a transmit device and a receive device), and it may be appropriate to modify codebooks, transmit powers, etc. To account for differences in near field operation and far field operation, the wireless communications system 100 may support identification or classification of whether a receive device is in a near or far field with respect to a transmit device.

A receive device may determine whether a transmit device is in its near field and may adapt transmissions accordingly, and, similarly, a transmit device may determine whether a receive device is in its near field and may adapt transmissions accordingly. In one aspect, a wireless device may support artificial intelligence (AI) or machine learning (ML) methods for capturing trends in local signal strength variation to determine whether a UE 115 is in a near field of a network entity 105. In another aspect, a wireless device may use coarse path loss estimations or phase variation measurements to determine whether a UE 115 is in the near field of a network entity 105. Once a classification is determined (e.g., of whether the UE 115 is in the near field of the network entity 105), the classification may be signaled to a transmit device or another device (e.g., a UE 115 or a network entity 105). In some cases, the wireless communications system 100 may include a network entity (e.g., an AI or ML server) that may receive feedback or other information to perform the classification. Further, aspects of the techniques described herein may be performed by a receive device or a transmit device in wireless communications system 100.

Figure 2:
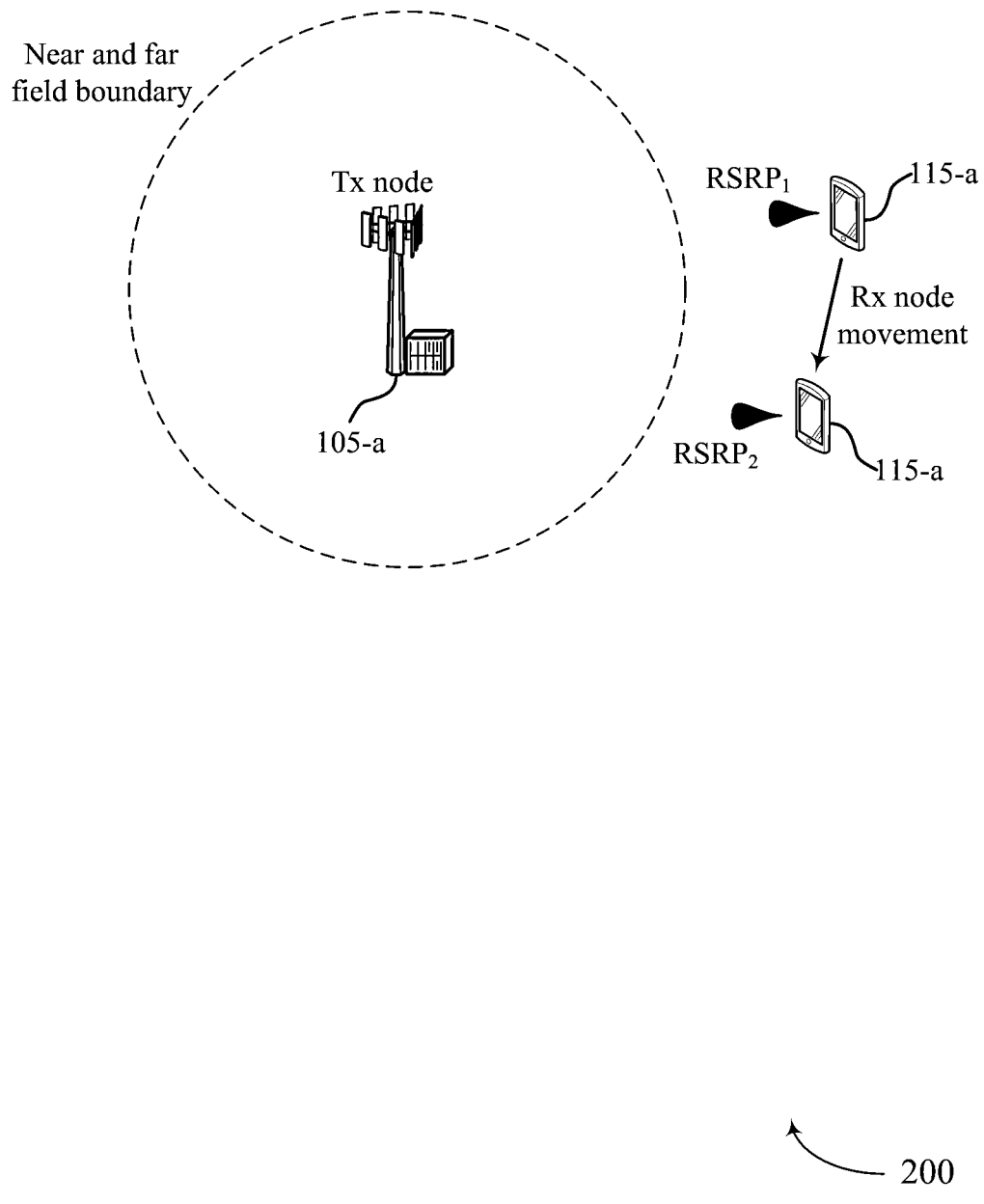
FIG. 2 illustrates an example of a wireless communications system showing far-field operation in accordance with one or more aspects of the present disclosure.

FIG. 2 illustrates an example of a wireless communications system 200 showing far field operation in accordance with one or more aspects of the present disclosure. The wireless communications system 200 includes a transmit node 105-a, which may be an example of a network entity 105 described with reference to FIG. 1. The wireless communications system 200 also includes a receive node 115-a, which may be an example of a UE 115 described with reference to FIG. 1. In some cases, directional beamforming may only be a function of angular information between the transmit node 105-a (e.g., dominant cluster in a channel) and the receive node 115-a (e.g., independent of a distance between the transmit node 105-a and the receive node 115-a, as long as the receive node 115-a is in a far field of the transmit node 105-a). The transmit node 105-a and the receive node 115-a may each use a directional analog beamforming codebook for beam selection, and angular information may be determined automatically with beam tracking. When beams are tracked, there may be no significant loss in reference signal received power (RSRP) or signal strength as the receive node 115-a moves locally around a point of operation.

In some cases, however, as the receive node 115-a gets closer to the transmit node 105-a, beamforming may become dependent on the distance between the transmit node 105-a and the receive node 115-a and angular information may change with distance. In such cases, it may be appropriate for the receive node 115-a to determine when to change beamforming parameters as a function of distance. Further, a distance threshold for near field operation (e.g., the Fraunhofer distance) may be a function of array size, carrier frequency, etc. and may increase as wireless communications systems continue to develop. Near field operation may be important when an aperture of an array is large since the Fraunhofer distance may increase. In addition, improved techniques for near field operation may be useful as a carrier frequency increases (e.g., since Fraunhofer distance is inversely proportional to wavelength).

One use case for near-field operation may be reconfigurable intelligent surfaces (RISs), also sometimes known as intelligent reflecting surfaces (IRSs), which may be simple to design and have low costs. Due to cost reasons, an RIS may not necessarily be intelligent and the control of determining near-field versus far-field operation may be (e.g., reside) at an off-RIS location (e.g., network servers, mobile edge computing (MEC) servers, etc.). Therefore, signaling of near-field and far-field determinations may be appropriate between the RIS and the off-MS location. As mentioned, a wireless communications system described herein may support techniques for near-field and far-field determination. For instance, a receive node may determine when it is in a near field and when it is in a far field and may adapt configurations and communications accordingly (e.g., to address different behaviors for near-field and far-field operation).

In one aspect, the wireless communications system may support a method for a receive node to communicate a beam identifier of a beam including a main lobe direction and beamwidth as well as a signal strength measured in beamforming with the beam to a processing network entity 105 (e.g., AI or ML server). The information provided to the processing network entity 105 may allow inferencing of the location of the receive node relative to a transmit node. The location of the receive node may be binarily classified as near-field or far-field. Near field may correspond to distances below the Fraunhofer distance threshold which is a function of an array geometry or size and carrier frequency. In another aspect, the wireless communications system may support a method for a processing network entity 105 to make an inference on a relative distance of a receive node from a transmit node based on information fed back to the processing network entity, and the processing network entity may communicate the inference to the receive and transmit nodes.

In yet another aspect, the wireless communications system may support a method for a processing network entity 105, a receive node, or both to make a coarse estimate of a relative distance between the receive node and a transmit node assuming a nominal value for a path loss exponent, and transmit and receive beamforming gains in a signal strength estimate with beamforming. In yet another aspect, the wireless communications system may support a method for a processing network entity 105, a receive node, or both to estimate a phase response with a set of beam weights and estimate whether the receive node is in a near field or far field with respect to a transmit node based on the phase response estimate.

Figure 3:
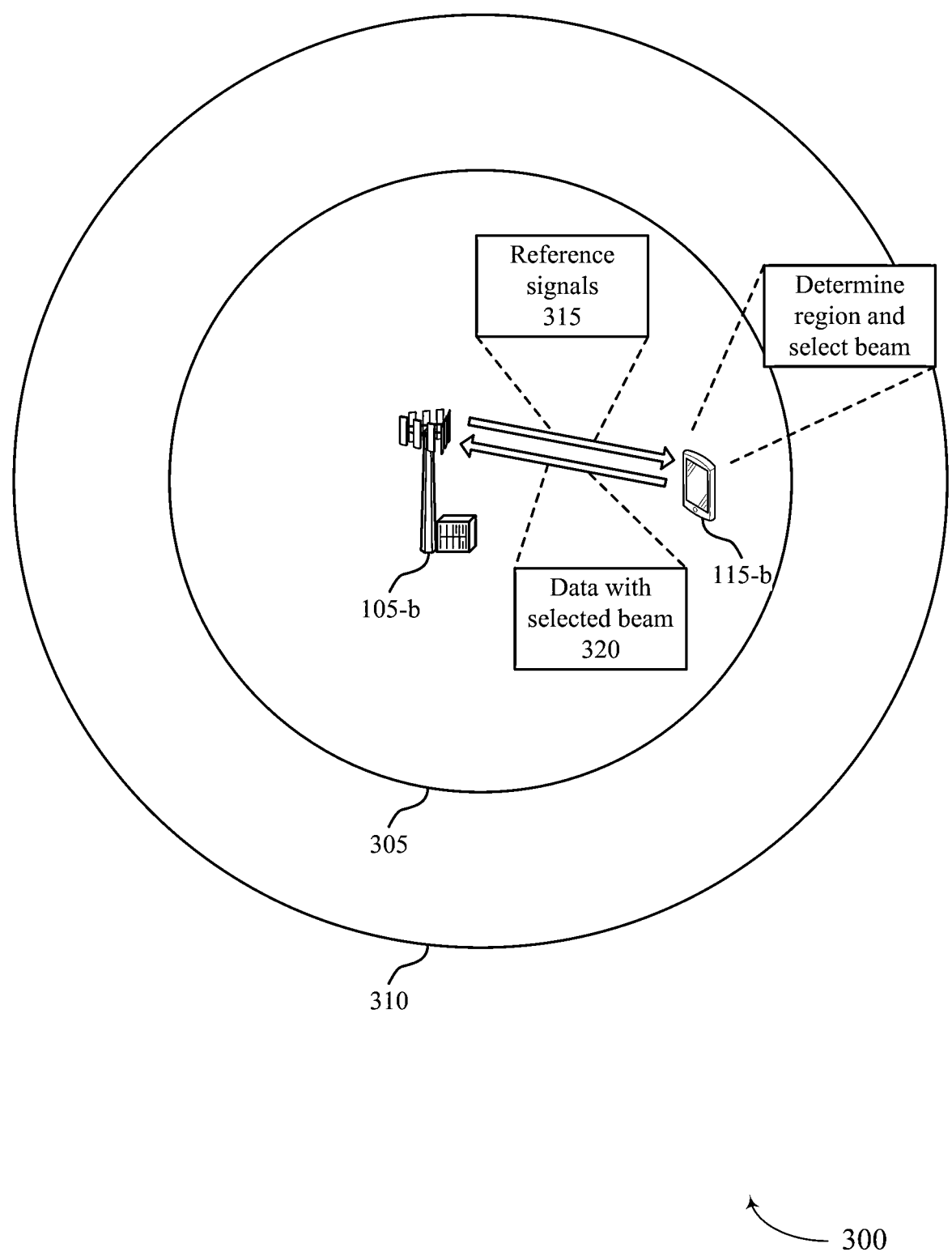
FIG. 3 illustrates an example of a wireless communications system that supports device region estimation for near-field operation in accordance with one or more aspects of the present disclosure.

FIG. 3 illustrates an example of a wireless communications system 300 that supports device region estimation for near-field operation in accordance with one or more aspects of the present disclosure. The wireless communications system 300 includes a first network entity 105-b, which may be an example of a first network entity 105 or a transmit node described with reference to FIGS. 1 and 2. The wireless communications system 300 also includes a UE 115-b, which may be an example of a UE 115 or a receive node described with reference to FIGS. 1 and 2. The first network entity 105-b may have a coverage area that includes a near-field region and a far-field region. The near-field region may refer to a region within a near-field region boundary 305, and the far-field region may refer to a region within a far-field region boundary 310 and outside of the near-field region. That is, the far-field region may extend beyond the near-field region. The wireless communications system 300 may implement aspects of the wireless communications system 100. For example, the wireless communications system 300 may support efficient techniques for determining a region in which the UE 115-b is located and performing beam selection based on the region.

The first network entity 105-b may transmit reference signals 315 to the UE 115-b, and the UE 115-b may perform measurements on the reference signals. The UE 115-b may then determine a region in which the UE 115-b is located relative to the first network entity 105-b based on the measurements (e.g., the near-field region or the far-field region), and the UE 115-b may select a beam for communicating with the first network entity 105-b based on the region in which the UE 115-b is located. In some cases, the first network entity 105-b may also select a beam for communicating with the UE 115-b based on the measurements performed at the UE 115-b. The UE 115-b and the first network entity 105-b may then communicate or exchange data 320 using the selected beams.

The UE 115-b and the first network entity 105-b may support one or more techniques for determining whether the UE 115-b is in the near field region or the far-field region. Although many of the techniques described relate to determining whether the UE 115-b is in the near-field region or the far-field region, the same techniques may be used to determine whether the UE 115-b is in any region, determine a distance between the UE 115-b and the first network entity 105-b, or determine an updated position of the UE 115-b after moving. The techniques described herein may be used separately or may be combined to facilitate device region estimation for near-field operation.

In one aspect of wireless communications system 300, a UE 115-b may exploit processing at a second network entity 105 to determine whether the UE 115-b is in a near-field region or a far-field region of a first network entity 105-b. For instance, the UE 115-b may use ML or AI techniques for near-field or far-field classification. The UE 115-b (e.g., a receive node) may be in either a near field or a far field and may perform beam or RSRP measurements as the UE 115-b moves. A correlation between the beam or RSRP measurements (e.g., signal strengths) and how these measurements change as the UE 115-b moves from one location to another may be used to determine whether the UE 115-b is in a near field or a far field. For instance, a device in wireless communications system 300 (e.g., the UE 115-b, the first network entity 105-b, or a second network entity 105) may distinguish between the behavior of the UE 115-b in a near-field (e.g., when moving) and fading. The level of distortion due to a UE 115-b moving in a far-field region may be given by a first formula, and the level of distortion due to a UE 115-b moving in a near-field region may be given by a second, more complicated formula.

Thus, a device in wireless communications system 300 may differentiate between movement in a near field, movement in a far field, movement across regions, or fading in wireless communications system 300, such that the device may determine a region in which the UE 115-b is located. Near-field induced signal distortions may be more correlated or deterministic than fading induced signal distortions. Fading may be random (e.g., in time, frequency, and space) as phase distortions corresponding to fading may be more independent from location to location (e.g., even if a new location is close by). Fading in time may be averaged out, although fading in space or frequency may be more complicated. Near-field induced phase distortions may be more predictable and may depend on path length differences only. Line-of-sight (LOS) path detection may also be performed based on polarization mismatches, standard rate doubling tests, etc.

Figure 4:
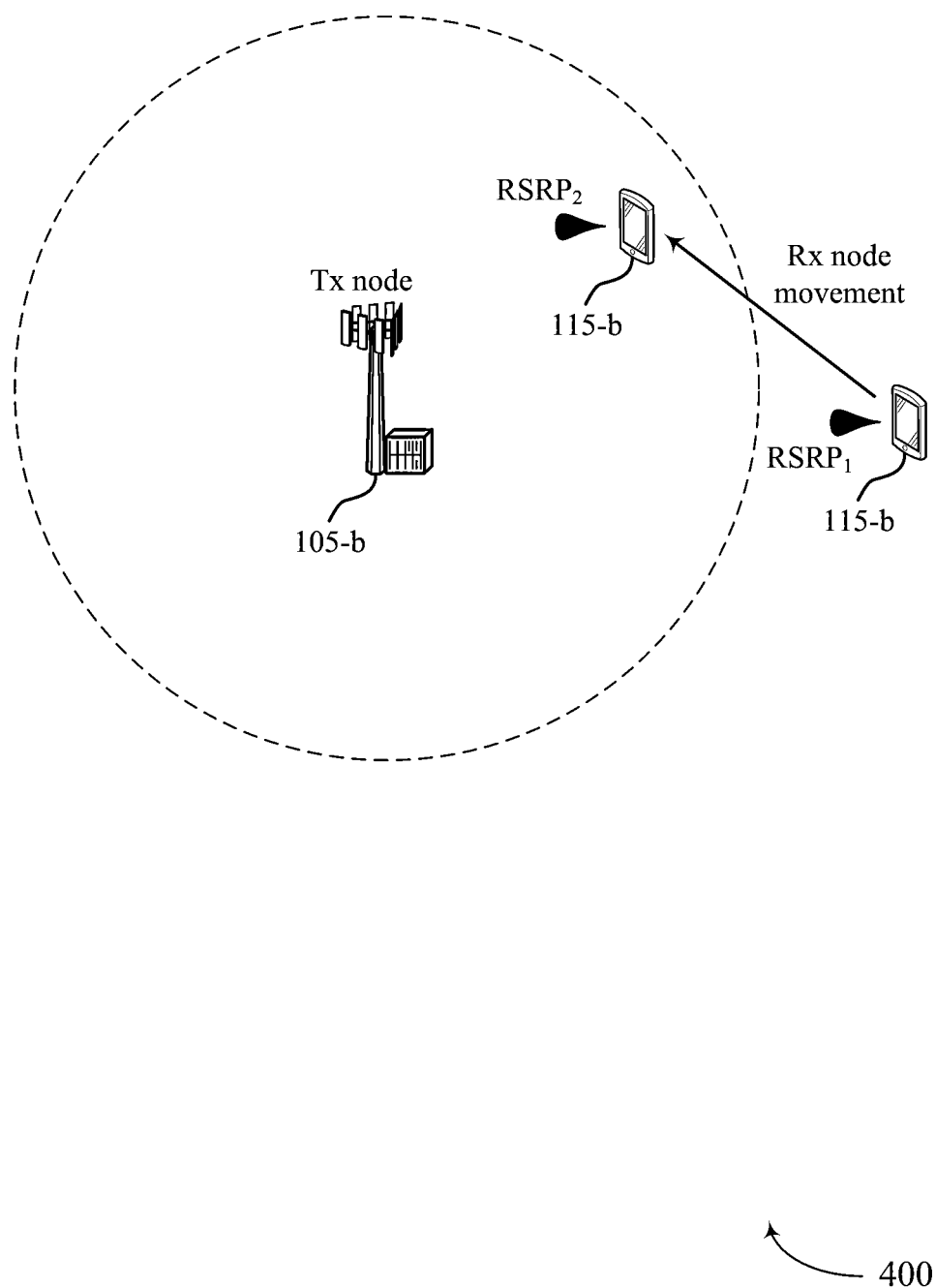
FIG. 4 illustrates an example of a wireless communications system showing movement from a far-field region to a near-field region in accordance with one or more aspects of the present disclosure.

FIG. 4 illustrates an example of a wireless communications system 400 showing movement from a far-field region to a near-field region in accordance with one or more aspects of the present disclosure. In the example of FIG. 4, even with optimal (e.g., the best) beam tuning, a second RSRP measured at the UE 115-b in a near field region may be substantially lower than a first RSRP measured at the UE 115-b in a far-field region (e.g., exceeding a configured threshold). The RSRP difference may be as a result of the UE 115-b moving into the near-field region and may be caused by a mismatch between electric fields or array response vectors seen by the UE 115-b corresponding to the direction of interest (e.g., for communicating with the first network entity 105-b) and what a codebook attempts to achieve in terms of co-phasing of electric field-based signal strengths across an antenna array.

Figure 5:
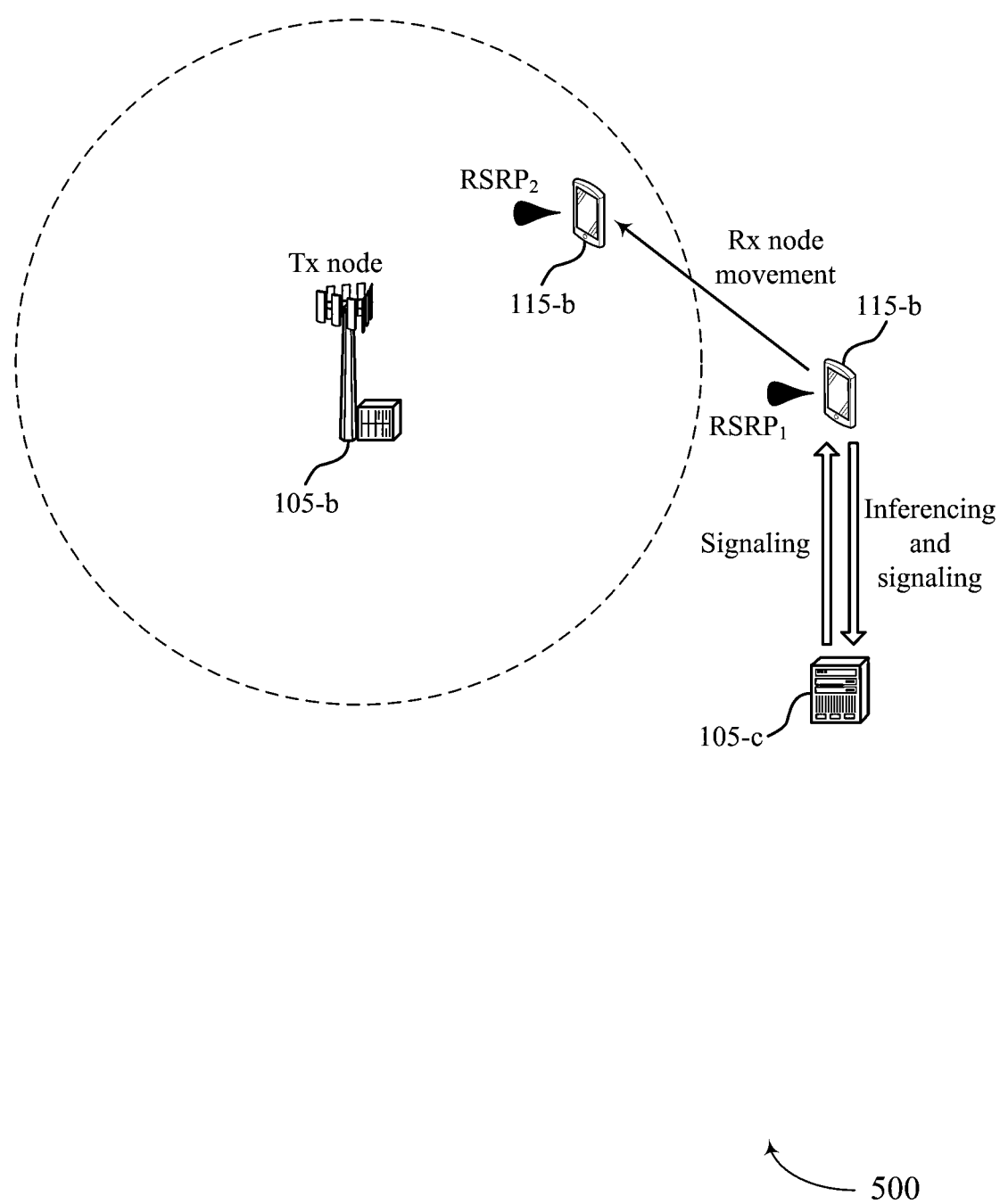
FIG. 5 illustrates an example of a wireless communications system showing signaling between a UE and a network entity to determine a region in which the UE is located in accordance with one or more aspects of the present disclosure.

FIG. 5 illustrates an example of a wireless communications system 500 showing signaling between a UE 115-b and a second network entity 105-c to determine a region in which the UE 115-b is located in accordance with one or more aspects of the present disclosure. The UE 115-b may exploit processing at the second network entity 105-c to determine whether the UE 115-b is in a near-field region or a far-field region. That is, the wireless communications system 500 may use ML or AI techniques for near or far field determination. The UE 115-b may communicate a beam ID of a best beam at the UE 115-b in different locations (e.g., indicating a main lobe orientation, width, etc. of the beam) to the second network entity 105-c. The UE 115-b may also communicate a location of the UE 115-b or observed signal strengths (e.g., RSRPs) to the second network entity 105-c (e.g., in the different locations).

The second network entity 105-c may then estimate a correlation between the beam ID, the location of the UE 115-b, or the observed signal strengths to determine whether the UE 115-b is in a near field or a far field (e.g., the location of the UE 115-b may be classified as being in a near field or a far field. In some cases, the second network entity 105-c may estimate the correlation based on past or historical data that determines thresholds for signal strengths. For instance, the second network entity 105-c may input the information received from the UE 115-b to a model trained to identify such thresholds to determine whether the UE 115-b is in the near field or the far field. The second network entity 105-c (e.g., AI or ML server) may identify whether the UE 115-b is in the near field or far field (e.g., relative to the first network entity 105-b) and may communicate this information (e.g., identification or determination) back to the UE 115-b, the first network entity 105-b, or both.

In some cases, the UE 115-b may provide additional information or additional measurements as input to the second network entity 105-c for the second network entity 105-c to use to determine whether the UE 115-b is in a near field or a far field. This additional information or these additional measurements may be useful for the second network entity 105-c (e.g., an AI or ML model at the second network entity 105-c) to learn a distinction between fading and near-field operation. In some examples, the UE 115-b may determine a quality of a line-of-sight path between the UE 115-b and the first network entity 105-b (e.g., line-of-sight determination and estimation) based on polarization characteristics, and the UE 115-b may provide the quality of the line-of-sight path to the second network entity 105-c as the additional information or additional measurements. In such examples, the first network entity 105-b may transmit reference signals to the UE 115-b with polarizations in two perpendicular directions. Fading randomness may be associated with a lack of a line-of-sight path or a weak or low-quality line-of-sight path. Accordingly, detection and strength estimation of a line-of-sight path may help distinguish fading from near-field operation (e.g., where near-field operation and far-field operation assume the presence of a line-of-sight path).

In one example, the first network entity 105-b may transmit a first reference signal with a first polarization and a second reference signal with a second polarization to the UE 115-b. The signals with the two polarizations may be independent but equally strong, and the UE 115-b may provide the strength of the respective signals (e.g., strength with which the respective signals are transmitted and received) to the second network entity 105-c (e.g., input to AI or ML algorithms). If the strengths of the signals transmitted with different polarizations and received at the UE 115-b are equally strong, a line-of-sight path may be dominant. Alternatively, if the UE 115-b observes local signal variation between the signals transmitted with different polarizations, the UE 115-b may be in a near-field. Further, if no line-of-sight path is present, the UE 115-b may be experiencing fading (e.g., in a fading condition).

In another example, the first network entity 105-b may transmit a reference signal with a first polarization and a second polarization to the UE 115-b. That is, a single signal may be transmitted with two polarization directions (e.g., using circular polarization), and the UE 115-b may provide a strength and polarization of the single signal received at the UE 115-b to the second network entity 105-c (e.g., input to AI or ML algorithms). If the received signal is circularly polarized with a same rotation direction, a line-of-sight path may be dominant. If no line-of-sight path is present, the UE 115-b may be experiencing fading (e.g., in a fading condition).

In another aspect of wireless communications system 300, the UE 115-b may determine whether the UE 115-b is in the near-field region or the far-field region based on path loss modeling. For instance, the UE 115-b may perform RSRP measurements on reference signals received from the first network entity 105-b, and the UE 115-b may use equation 1 below to determine a distance between the UE 115-b and the first network entity 105-b based on the RSRP.

$$RSRP = P_{bump} + P_{elem} + G_{tx} + G_{rx} - 10\log_{10}\left(\frac{4\pi}{\lambda}\right) - 10 \times PLE \times \log_{10}(\text{distance}) \quad (1)$$

$P_{bump}$ may be the power at a power amplifier of the first network entity 105-b used to transmit the reference signals, $P_{elem}$ may be an elemental gain of a transmit antenna at the first network entity 105-b, $N_t$ and $N_r$ may be a number of antenna elements at transmit and receive arrays, respectively, and RSRP may be the RSRP seen with beamforming. PLE may refer to a path loss exponent or a quality of a link. The nominal value of $P_{bump}+P_{elem}+G_{tx}$ may be communicated by the first network entity 105-b to the UE 115-b or may be determined based on some reference signal estimate as a measure of path loss. As a coarse estimate, the UE 115-b, the first network entity 105-b, or both may assume that $G_{rx}=10\times\log_{10}(N_r)$, and the UE 115-b, the first network entity 105-b, or both may assume a nominal value for a path loss exponent (e.g., 2.5). Further, since RSRP is measured, the UE 115-b, the first network entity 105-b, or both may determine the distance using equation 1.

If $G_{tx}$, $G_{rx}$, and PLE are not correctly estimated, a distance estimate determined using equation 1 may be treated as a coarse estimate. Alternatively, the first network entity 105-b may attempt beam switching, and the UE 115-b, the first network entity 105-b, or both may try to estimate distance based on RSRP estimates (e.g., from different beam pairs). In some cases, the UE 115-b may communicate with a second network entity 105-c (e.g., an AI or ML server) to obtain better or more precise estimates of distance, where the second network entity 105-c may determine better choices for PLE based on a sense of an environment, etc. Line-of-sight path detection and estimation in addition to phase measurements may also be added as additional input to the second network entity 105-c to determine whether the UE 115-b is in a near field region or a far field region.

Figure 6:
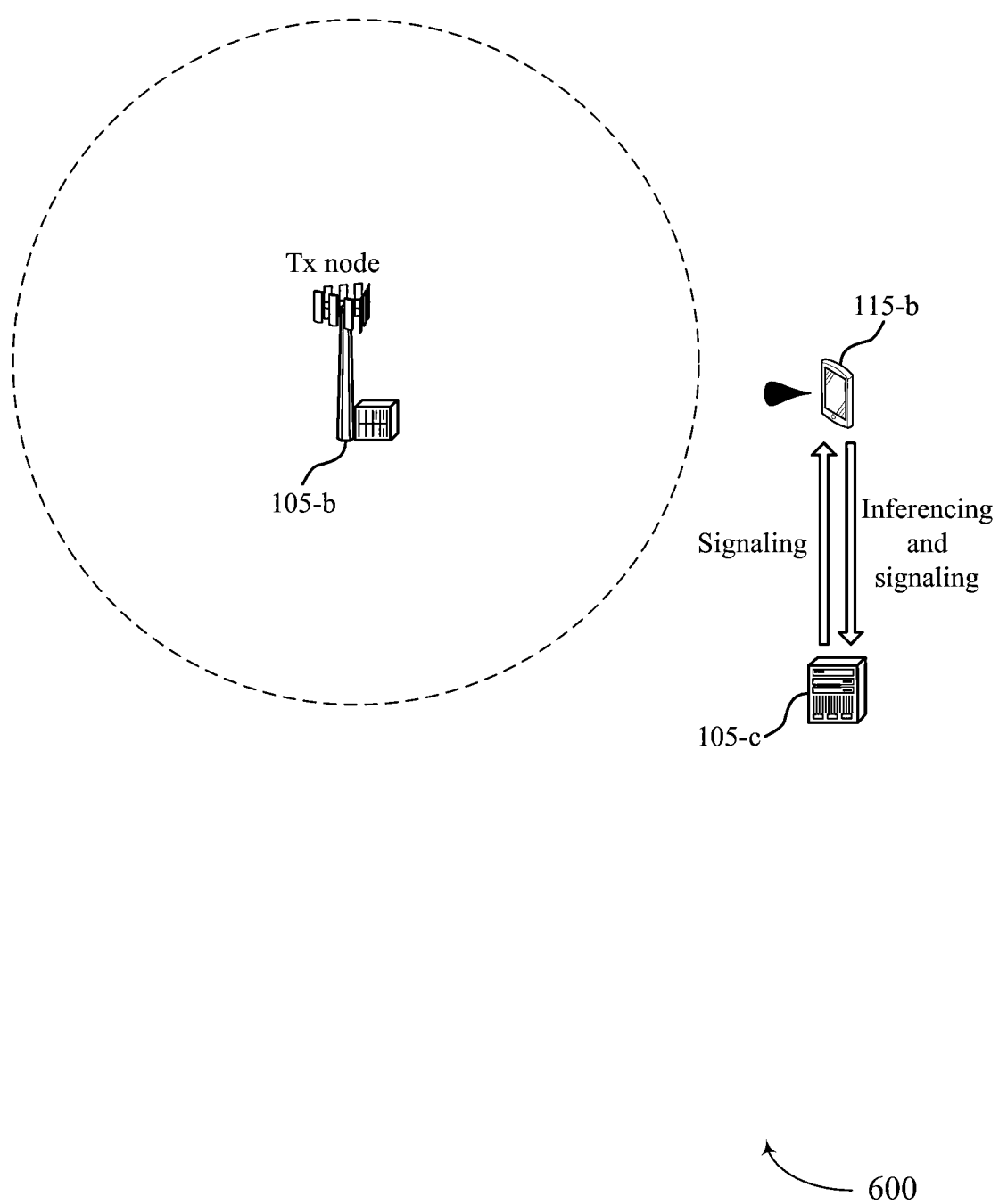
FIG. 6 illustrates an example of a wireless communications system showing signaling between a UE and a network entity to determine a region in which the UE is located in accordance with one or more aspects of the present disclosure.

FIG. 6 illustrates an example of a wireless communications system 600 showing signaling between a UE 115-b and a second network entity 105-b to determine a region in which the UE 115-b is located in accordance with one or more aspects of the present disclosure. In the example of FIG. 6, the signaling to the second network entity 105-c may include RSRP measurements, line-of-sight path quality information, phase measurements, or information related to the reference signals transmitted by the first network entity 105-b to the UE 115-b (e.g., quantity of antenna elements used to transmit the reference signals, beam weights used to transmit or receive the reference signals, a carrier frequency, etc.). The second network entity 105-c may then use this information to determine whether the UE 115-b is in a near-field region or a far-field region of the first network entity 105-b.

In another aspect of wireless communications system 300, the UE 115-b may determine whether the UE 115-b is in the near-field region or the far-field region based on phase measurements.

Figure 7:
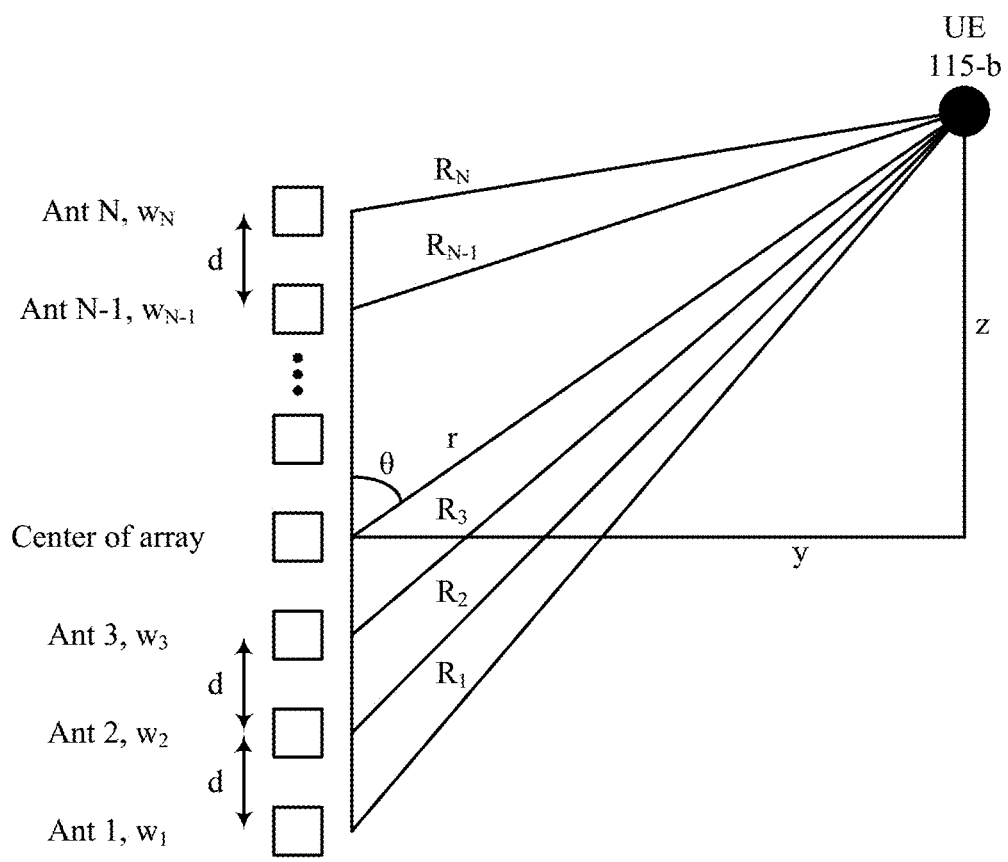
FIG. 7 illustrates an example of antenna elements used by a network entity to transmit reference signals to a UE in accordance with one or more aspects of the present disclosure.

FIG. 7 illustrates an example of antenna elements 700 used by a first network entity 105-b to transmit reference signals to a UE 115-b in accordance with one or more aspects of the present disclosure. The first network entity 105-b may use N antenna elements with beam weights $w_i$, where i=1, ..., N, to communicate with the UE 115-b. The antenna elements may be placed in a linear array with an inter-antenna element spacing of d. A path loss difference of $\lambda$ may lead to a phase change of $2\pi$. As such, a gain seen with beamforming may be given by equation 2.

$$G = \left|\sum_{i=1}^{N} w_i e^{\frac{j2\pi \cdot (R_i - r)}{\lambda}}\right|^2 \quad (2)$$

In addition, given the layout of the antenna elements in FIG. 7, the relationships between characteristics of the antenna elements may be modeled using equations 3-7.

$$r^2 = y^2 + z^2 \quad (3)$$

$$\sin(\theta) = \cos(90 - \theta) = \frac{y}{r} \quad (4)$$

$$\cos(\theta) = \sin(90 - \theta) = \frac{z}{r} \quad (5)$$

$$R^2_{\frac{N}{2}-k+1} = \left(z + (k-1)d + \frac{d}{2}\right)^2 + y^2 \quad (6)$$

$$= r^2 + \left((k-1)d + \frac{d}{2}\right)^2 + 2r\cos(\theta)\left((k-1)d + \frac{d}{2}\right),$$

$$k = 1, \ldots, \frac{N}{2}$$

$$R_{\frac{N}{2}+k}^2 = \left(z - (k-1)d - \frac{d}{2}\right)^2 + y^2 \qquad (7)$$

$$= r^2 + \left((k-1)d + \frac{d}{2}\right)^2 - 2r\cos(\theta)\left((k-1)d + \frac{d}{2}\right),$$

$$k = 1, \ldots, \frac{N}{2}$$

The first network entity 105-b and the UE 115-b may transmit and receive reference signals using different beam weights of the form [1 0 . . . 0], where 1 is over a reference antenna element and beam weights of the form [0 1 0 . . . 0], where 1 is over a measurement antenna element. The UE 115-b may measure a phase response with the two different beam weights and may compare this phase response to determine a distance between the UE 115-b and the first network entity 105-b. In some implementations, it may be challenging to measure the phase responses. In such implementations, signal strengths may be used as a proxy to measure phases. When it is feasible to perform phase measurements, then a phase measurement method may be used on its own (e.g., using phase measurements to determine distance or a region in which the UE 115-b is located). Thus, the phase measurement method may be used on its own or in combination with any of the techniques described herein.

In an example of the phase measurement method, the UE 115-b may measure a phase difference between the reference signals received from the first network entity 105-b. For instance, if an i-th antenna is a reference antenna and a j-th antenna is a measurement antenna, the phase difference measured by the UE 115-b may be equal to $2\pi/\lambda \cdot (R_i - R_j)$. The UE 115-b may then compute the values of $R_i$ and $R_j$, and the UE 115-b may use equations 6 and 7 and the values of $R_i$ and $R_j$ to compute the value of r, which may correspond to the distance between the UE 115-b and the first network entity 105-b. With multiple choices of a measurement antenna (e.g., j-th index), $R_i - R_j$ may be used to establish an estimate of a distance between the UE 115-b and the first network entity 105-b (e.g., transmit and receive nodes).

Figure 8:
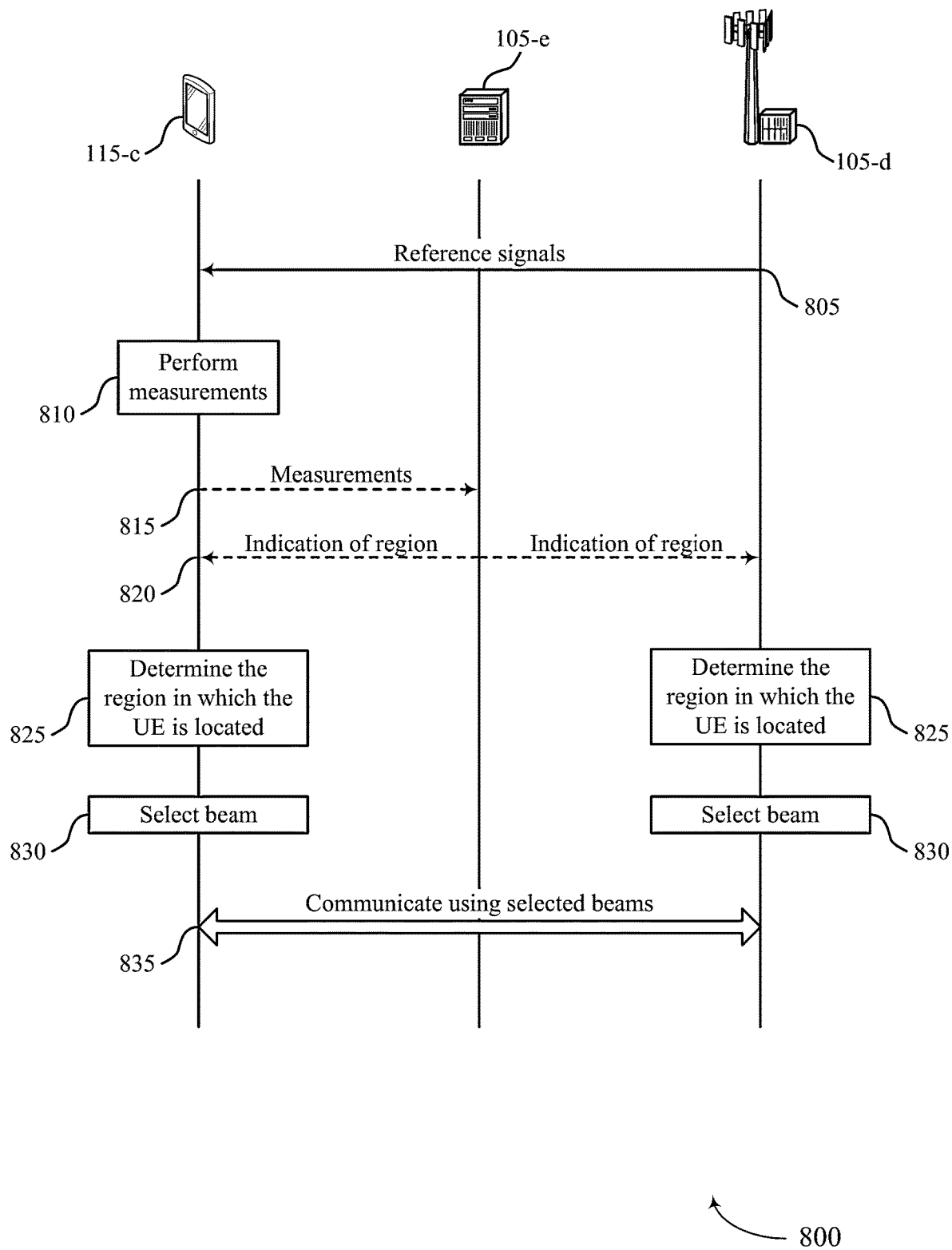
FIG. 8 illustrates an example of a process flow that supports device region estimation for near-field operation in accordance with one or more aspects of the present disclosure.

FIG. 8 illustrates an example of a process flow 800 that supports device region estimation for near-field operation in accordance with one or more aspects of the present disclosure. The process flow 800 includes a UE 115-c, which may be an example of a UE 115 described with reference to FIGS. 1-7. The process flow 800 also includes a first network entity 105-d and a second network entity 105-e, which may be examples of network entities 105 described with reference to FIGS. 1-7. The process flow 800 may implement aspects of the wireless communications system 100 or the wireless communications system 300. For example, devices in the process flow 800 may support efficient techniques for determining a region in which the UE 115-c is located and performing beam selection based on the region.

In the following description of the process flow 800, the signaling exchanged between the UE 115-c, the first network entity 105-d, and the second network entity 105-e may be exchanged in a different order than the example order shown, or the operations performed by the UE 115-c, the first network entity 105-d, and the second network entity 105-e may be performed in different orders or at different times. Some operations may also be omitted from the process flow 800, and other operations may be added to the process flow 800.

At 805, the first network entity 105-d may transmit, and the UE 115-c may receive, reference signals on one or more beams. At 810, the UE 115-c may perform one or more signal strength measurements (e.g., RSRP) on the reference signals. At 815, the UE 115-c may report, to the second network entity 105-e, the one or more measurements performed on the reference signals. In some examples, the UE 115-c may report, to the second network entity 105-e, an identifier of a beam at the UE 115-c associated with one or more highest signal strength measurements and an indication of the signal strength measurements. In other examples, the UE 115-c may report, to the second network entity 105-e, a location of the UE 115-c. In yet other examples, the UE 115-c may report, to the second network entity 105-e, a quality of a line-of-sight path between the UE 115-c and the first network entity 105-d.

In some cases, the UE 115-c may compare a first signal strength of a first reference signal of the reference signals received from the first network entity 105-d and a second signal strength of a second reference signal received from the first network entity 105-d, where the first reference signal has a first polarization and the second reference signal has a second polarization. In such cases, the first network entity 105-d may be configured to transmit the first reference signal with the first polarization and the second reference signal with the second polarization. The UE 115-c may then determine the quality of the line-of-sight path estimate between the UE 115-c and the first network entity 105-d based on the comparing. In other cases, the UE 115-c may compare a first signal strength of a first polarization of a reference signal of the reference signals received from the first network entity 105-d and a second signal strength of a second polarization of the reference signal. In such cases, the first network entity 105-d may be configured to transmit the reference signal with the first polarization and the second polarization. The UE 115-c may then determine the quality of the line-of-sight path estimate between the UE 115-c and the first network entity 105-d based on the comparing.

At 820, the UE 115-c may then receive, from the second network entity 105-e, an indication of the region in which the UE 115-c is located relative to the first network entity 105-d based on reporting the one or more measurements to the second network entity 105-e. At 825, the UE 115-c may determine a region in which the UE 115-c is located relative to the first network entity 105-d based on performing the one or more measurements. For instance, the UE 115-c may determine whether the UE 115-c is in a near-field region or a far-field region of the first network entity 105-d. The far-field region of the first network entity 105-d may be a region beyond a Fraunhofer distance of the first network entity 105-d. In some cases, the UE 115-c may determine the region in which the UE 115-c is located without communicating with the second network entity 105-e (e.g., independent of the second network entity 105-e). In other cases, the UE 115-c may determine the region in which the UE 115-c is located based on the indication received from the second network entity 105-e at 820.

In one aspect, the UE 115-c may perform RSRP measurements on the reference signals at 810. The UE 115-c may then determine the region in which the UE 115-c is located based on the RSRP measurements. In some cases, the UE 115-c may determine the region in which the UE 115-c is located based on the RSRP measurements and additional information related to the RSRP measurements or the reference signals on which the RSRP measurements are performed. Additionally, or alternatively, the UE 115-c may report the RSRP measurements to the second network entity 105-e, and the UE 115-c may receive, from the second network entity 105-e, an indication of the region in which the UE 115-c is located relative to the first network entity 105-d based on reporting the RSRP measurements.

In another aspect, the UE 115-c may perform the first RSRP measurements on the reference signals received on a first beam at the UE 115-c and the second RSRP measurements on the reference signals received on a second beam at the UE 115-c. The UE 115-c may then determine the region in which the UE 115-c is located based on the first and second RSRP measurements. In some cases, the UE 115-c may determine the region in which the UE 115-c is located based on the first and second RSRP measurements and additional information related to the first and second RSRP measurements or the reference signals on which the first and second RSRP measurements are performed. Additionally, or alternatively, the UE 115-c may report the first and second RSRP measurements to the second network entity 105-e, and the UE 115-c may receive, from the second network entity 105-e, an indication of the region in which the UE 115-c is located relative to the first network entity 105-d based on reporting the first and second RSRP measurements.

The additional information related to the RSRP measurements or the reference signals on which the RSRP measurements are performed may include a power with which the reference signals are transmitted from a power amplifier, an elemental gain at a transmit antenna element used to transmit the reference signals, a first quantity of antenna elements at a transmit antenna array, a second quantity of antenna elements at a receive antenna array, and an estimated path loss exponent for a communications link between the first network entity 105-d and the UE 115-c.

In yet another aspect, the UE 115-c may receive a first set of the reference signals at 805 from the first network entity 105-d using a first set of beam weights and a second set of the reference signals from the first network entity 105-d using a second set of beam weights. The UE 115-c may then determine the region in which the UE is located relative to the first network entity 105-d based on a phase difference between the first set of the reference signals and the second set of the reference signals. In some cases, the UE 115-c may determine the region in which the UE 115-c is located relative to the first network entity 105-d based on the phase difference and parameters of a transmit antenna array at the first network entity 105-d used to transmit the first set of reference signals and the second set of reference signals. Additionally, or alternatively, the UE 115-c may report, to the second network entity 105-d, the phase difference between the first set of the reference signals received using the first set of beam weights and the second set of the reference signals received using the second set of beam weights, and the UE 115-c may receive an indication of the region in which the UE 115-c is located relative to the first network entity 105-d based on reporting the phase difference.

Although the techniques described above are related to the UE 115-c determining the region in which the UE 115-c is located, the first network entity 105-d may use the same or similar techniques to determine the region in which the UE 115-c is located. For instance, the UE 115-c may transmit the measurements to the first network entity 105-d or may transmit other information derived from the measurements to the first network entity 105-d, and the first network entity may use the measurements or the other information to determine the region in which the UE 115-c is located. The first network entity 105-d may also receive the indication at 820 of the region in which the UE 115-c is located from the second network entity 105-e at 820.

At 830, the UE 115-c, the first network entity 105-d, or both may select a beam for communicating based on the region in which the UE 115-c is located. The UE 115-c, the first network entity 105-d, or both may identify an analog or hybrid beamforming codebook from which to select the beam for communicating with the first network entity 105-d based on the region in which the UE is located relative to the first network entity 105-d, and the UE 115-c, the first network entity 105-d, or both may select the beam for communicating from the analog or hybrid beamforming codebook. At 835, the UE 115-c and the first network entity 105-d may then communicate using the selected beams.

Figure 9:
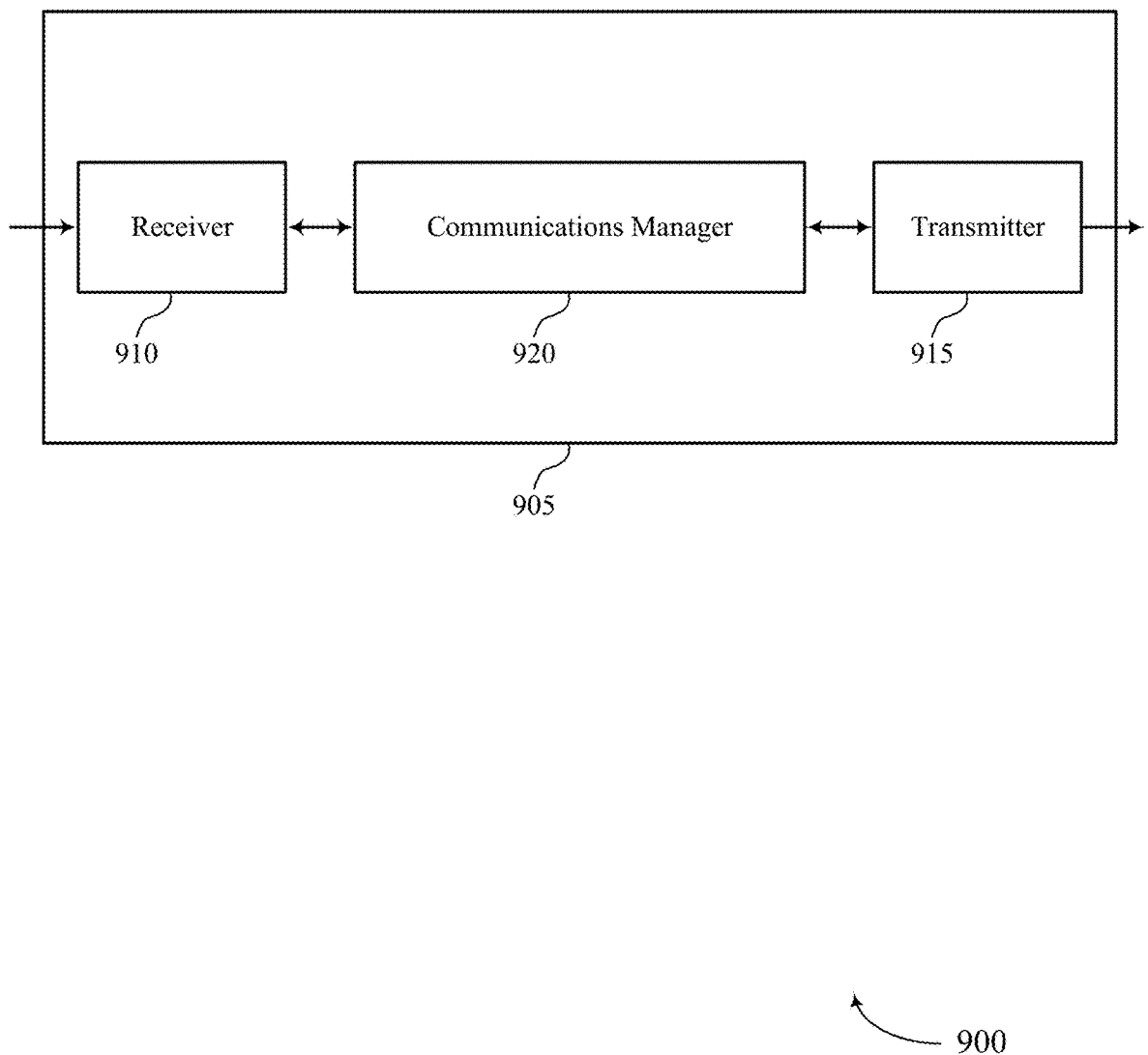
FIGS. 9 and 10 show block diagrams of devices that support device region estimation for near-field operation in accordance with one or more aspects of the present disclosure.

FIG. 9 shows a block diagram 900 of a device 905 that supports device region estimation for near-field operation in accordance with one or more aspects of the present disclosure. The device 905 may be an example of aspects of a UE 115 as described herein. The device 905 may include a receiver 910, a transmitter 915, and a communications manager 920. The device 905 may also include one or more processors, memory coupled with the one or more processors, and instructions stored in the memory that are executable by the one or more processors to enable the one or more processors to perform the beam management features discussed herein. Each of these components may be in communication with one another (e.g., via one or more buses).

The receiver 910 may provide a means for receiving information such as packets, user data, control information, or any combination thereof associated with various information channels (e.g., control channels, data channels, information channels related to device region estimation for near-field operation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to device region estimation for near-field operation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of device region estimation for near-field operation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for receiving reference signals from a first network entity on one or more beams at the UE. The communications manager 920 may be configured as or otherwise support a means for performing one or more measurements on the reference signals. The communications manager 920 may be configured as or otherwise support a means for determining a region in which the UE is located relative to the first network entity based on performing the one or more measurements. The communications manager 920 may be configured as or otherwise support a means for selecting a beam for communicating with the first network entity based on the region in which the UE is located.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources. Because the device 905 may be able to determine whether the device 905 is in a near-field region or a far-field region, beam management at the device 905 may be improved, and the device 905 may identify suitable beams for communicating with a network entity. As a result, the device 905 may experience reduced distortion during communications with the network entity, resulting in the reduced processing, the reduced power consumption, and more efficient utilization of communication resources.

Figure 10:
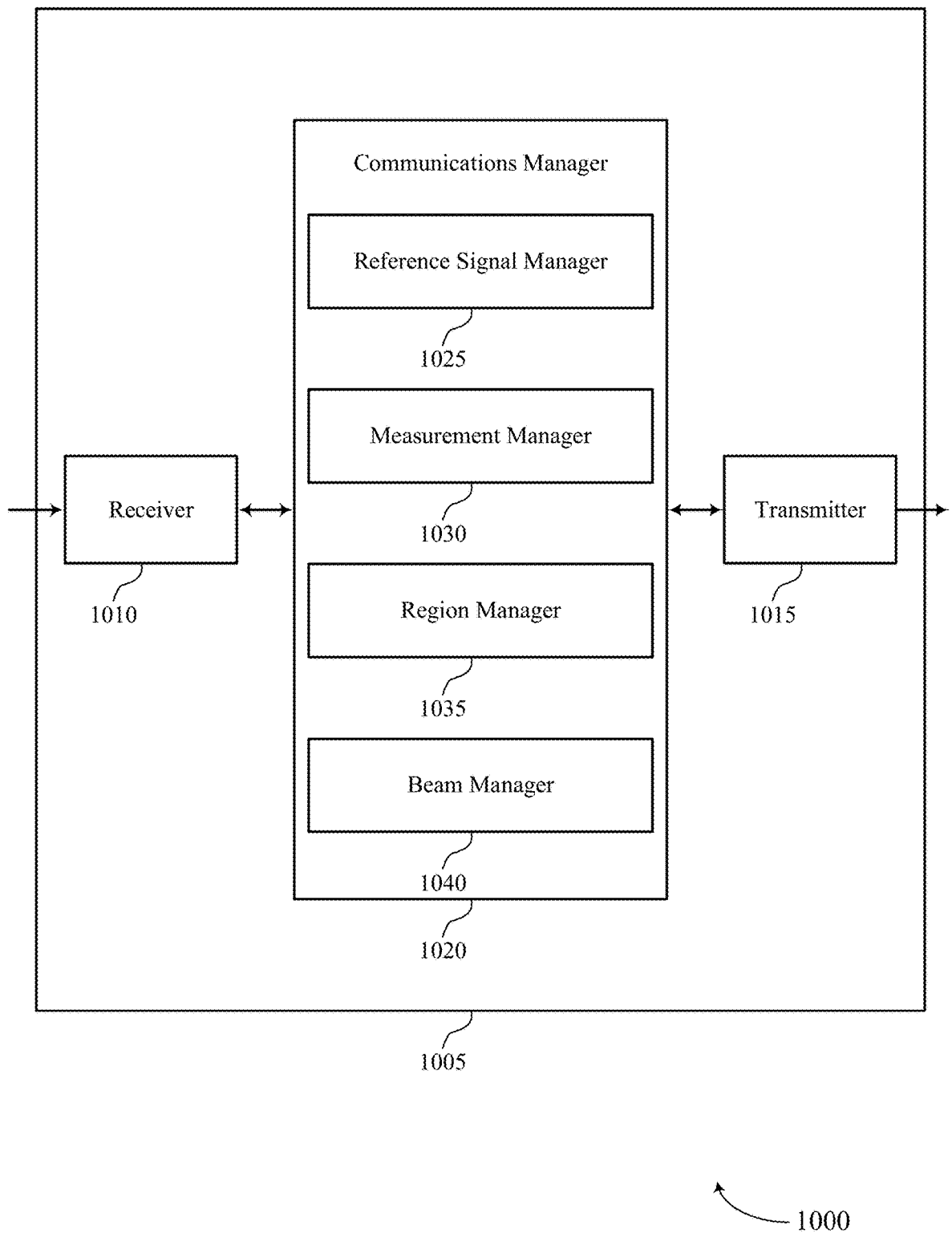

FIG. 10 shows a block diagram 1000 of a device 1005 that supports device region estimation for near-field operation in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to device region estimation for near-field operation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to device region estimation for near-field operation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of device region estimation for near-field operation as described herein. For example, the communications manager 1020 may include a reference signal manager 1025, a measurement manager 1030, a region manager 1035, a beam manager 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The reference signal manager 1025 may be configured as or otherwise support a means for receiving reference signals from a first network entity on one or more beams at the UE. The measurement manager 1030 may be configured as or otherwise support a means for performing one or more measurements on the reference signals. The region manager 1035 may be configured as or otherwise support a means for determining a region in which the UE is located relative to the first network entity based on performing the one or more measurements. The beam manager 1040 may be configured as or otherwise support a means for selecting a beam for communicating with the first network entity based on the region in which the UE is located.

In some cases, the reference signal manager 1025, the measurement manager 1030, the region manager 1035, and the beam manager 1040 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reference signal manager 1025, the measurement manager 1030, the region manager 1035, and the beam manager 1040 discussed herein. A transceiver processor may be collocated with and/or communicate with (e.g., direct the operations of) a transceiver of the device. A radio processor may be collocated with and/or communicate with (e.g., direct the operations of) a radio (e.g., N NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
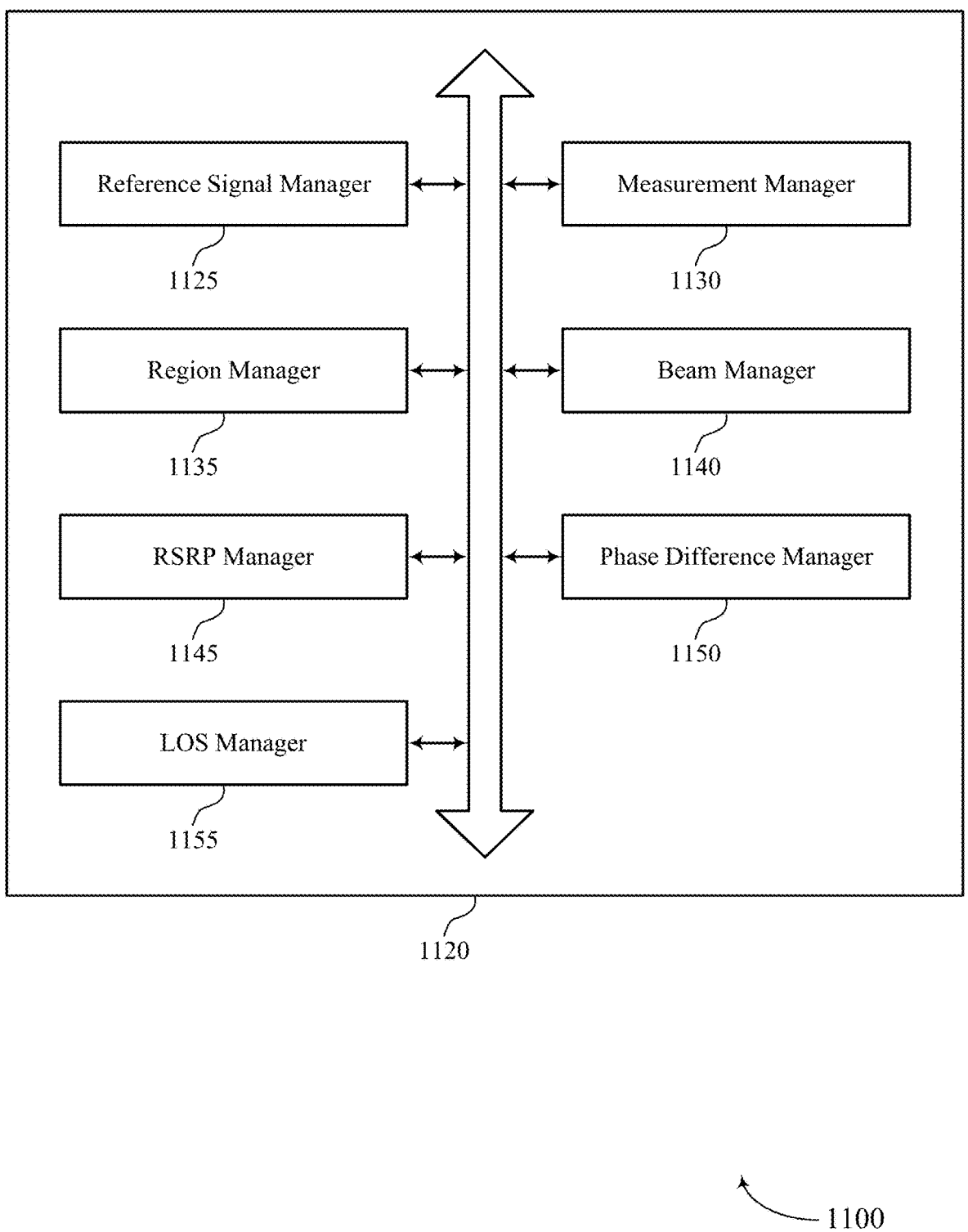
FIG. 11 shows a block diagram of a communications manager that supports device region estimation for near-field operation in accordance with one or more aspects of the present disclosure.

FIG. 11 shows a block diagram 1100 of a communications manager 1120 that supports device region estimation for near-field operation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of device region estimation for near-field operation as described herein. For example, the communications manager 1120 may include a reference signal manager 1125, a measurement manager 1130, a region manager 1135, a beam manager 1140, an RSRP manager 1145, a phase difference manager 1150, a LOS manager 1155, or any combination thereof. Each of these components may communicate, directly or indirectly, with one another (e.g., via one or more buses).

The communications manager 1120 may support wireless communication at a UE in accordance with examples as disclosed herein. The reference signal manager 1125 may be configured as or otherwise support a means for receiving reference signals from a first network entity on one or more beams at the UE. The measurement manager 1130 may be configured as or otherwise support a means for performing one or more measurements on the reference signals. The region manager 1135 may be configured as or otherwise support a means for determining a region in which the UE is located relative to the first network entity based on performing the one or more measurements. The beam manager 1140 may be configured as or otherwise support a means for selecting a beam for communicating with the first network entity based on the region in which the UE is located.

In some examples, the measurement manager 1130 may be configured as or otherwise support a means for reporting, to a second network entity, the one or more measurements performed on the reference signals. In some examples, the region manager 1135 may be configured as or otherwise support a means for receiving, from the second network entity, an indication of the region in which the UE is located relative to the first network entity based on reporting the one or more measurements.

In some examples, to support reporting the one or more measurements, the measurement manager 1130 may be configured as or otherwise support a means for reporting, to the second network entity, an identifier of a beam at the UE associated with one or more highest signal strength measurements and an indication of the signal strength measurements, where receiving the indication of the region in which the UE is located relative to the first network entity is based on reporting the identifier of the beam and the indication of the signal strength measurements.

In some examples, to support reporting the one or more measurements, the region manager 1135 may be configured as or otherwise support a means for reporting, to the second network entity, a location of the UE, where receiving the indication of the region in which the UE is located relative to the first network entity is based on reporting the location of the UE.

In some examples, to support reporting the one or more measurements, the LOS manager 1155 may be configured as or otherwise support a means for reporting, to the second network entity, a quality of a line-of-sight path between the UE and the first network entity, where receiving the indication of the region in which the UE is located relative to the first network entity is based on reporting the quality of the line-of-sight path.

In some examples, the LOS manager 1155 may be configured as or otherwise support a means for comparing a first signal strength of a first reference signal of the reference signals received from the first network entity and a second signal strength of a second reference signal of the reference signals received from the first network entity, the first reference signal having a first polarization and the second reference signal having a second polarization. In some examples, the LOS manager 1155 may be configured as or otherwise support a means for determining the quality of the line-of-sight path between the UE and the first network entity based on the comparing.

In some examples, the LOS manager 1155 may be configured as or otherwise support a means for comparing a first signal strength of a first polarization of a reference signal of the reference signals received from the first network entity and a second signal strength of a second polarization of the reference signal. In some examples, the LOS manager 1155 may be configured as or otherwise support a means for determining the quality of the line-of-sight path between the UE and the first network entity based on the comparing.

In some examples, to support performing the one or more measurements on the reference signals, the RSRP manager 1145 may be configured as or otherwise support a means for performing reference signal received power measurements on the reference signals received on a single beam at the UE, and where determining the region in which the UE is located relative to the first network entity includes. In some examples, to support performing the one or more measurements on the reference signals, the region manager 1135 may be configured as or otherwise support a means for determining the region in which the UE is located relative to the first network entity based on the reference signal received power measurements.

In some examples, to support determining the region in which the UE is located relative to the first network entity, the region manager 1135 may be configured as or otherwise support a means for determining the region in which the UE is located relative to the first network entity based on the reference signal received power measurements, a power with which the reference signals are transmitted from a power amplifier, an elemental gain at a transmit antenna element used to transmit the reference signals, a first quantity of antenna elements at a transmit antenna array, a second quantity of antenna elements at a receive antenna array, and an estimated path loss exponent for a communications link between the first network entity and the UE.

In some examples, to support determining the region in which the UE is located relative to the first network entity, the RSRP manager 1145 may be configured as or otherwise support a means for reporting the reference signal received power measurements to a second network entity. In some examples, to support determining the region in which the UE is located relative to the first network entity, the region manager 1135 may be configured as or otherwise support a means for receiving, from the second network entity, an indication of the region in which the UE is located relative to the first network entity based on reporting the reference signal received power measurements.

In some examples, to support performing the one or more measurements on the reference signals, the RSRP manager 1145 may be configured as or otherwise support a means for performing first reference signal received power measurements on the reference signals received on a first beam at the UE and second reference signal received power measurements on the reference signals received on a second beam at the UE, and where determining the region in which the UE is located relative to the first network entity includes. In some examples, to support performing the one or more measurements on the reference signals, the region manager 1135 may be configured as or otherwise support a means for determining the region in which the UE is located relative to the first network entity based on the first reference signal received power measurements and the second reference signal received power measurements.

In some examples, to support determining the region in which the UE is located relative to the first network entity, the RSRP manager 1145 may be configured as or otherwise support a means for reporting the first reference signal received power measurements and the second reference signal received power measurements to a second network entity. In some examples, to support determining the region in which the UE is located relative to the first network entity, the region manager 1135 may be configured as or otherwise support a means for receiving, from the second network entity, an indication of the region in which the UE is located relative to the first network entity based on reporting the first and second reference signal received power measurements.

In some examples, the phase difference manager 1150 may be configured as or otherwise support a means for receiving a first set of the reference signals from the first network entity using a first set of beam weights and a second set of the reference signals from the first network entity using a second set of beam weights. In some examples, the region manager 1135 may be configured as or otherwise support a means for determining the region in which the UE is located relative to the first network entity based on a phase difference between the first set of the reference signals and the second set of the reference signals.

In some examples, the phase difference manager 1150 may be configured as or otherwise support a means for reporting, to a second network entity, the phase difference between the first set of the reference signals received using the first set of beam weights and the second set of the reference signals received using the second set of beam weights. In some examples, the region manager 1135 may be configured as or otherwise support a means for receiving, from the second network entity, an indication of the region in which the UE is located relative to the first network entity based on reporting the phase difference.

In some examples, the determining the region in which the UE is located relative to the first network entity is further based on parameters of a transmit antenna array at the first network entity used to transmit the first set of reference signals and the second set of reference signals.

In some examples, to support selecting the beam for communicating with the first network entity, the beam manager 1140 may be configured as or otherwise support a means for identifying an analog or hybrid beamforming codebook from which to select the beam for communicating with the first network entity based on the determined region in which the UE is located relative to the first network entity.

In some examples, to support selecting the beam for communicating with the first network entity, the beam manager 1140 may be configured as or otherwise support a means for selecting the beam for communicating with the first network entity from the analog or hybrid beamforming codebook.

In some examples, to support determining the region in which the UE is located relative to the first network entity, the region manager 1135 may be configured as or otherwise support a means for determining whether the UE is in a near-field region or a far-field region of the first network entity.

In some examples, the far-field region of the first network entity is a region beyond a Fraunhofer distance of the first network entity.

In some cases, the reference signal manager 1125, the measurement manager 1130, the region manager 1135, the beam manager 1140, the RSRP manager 1145, the phase difference manager 1150, and the LOS manager 1155 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reference signal manager 1125, the measurement manager 1130, the region manager 1135, the beam manager 1140, the RSRP manager 1145, the phase difference manager 1150, and the LOS manager 1155 discussed herein.

Figure 12:
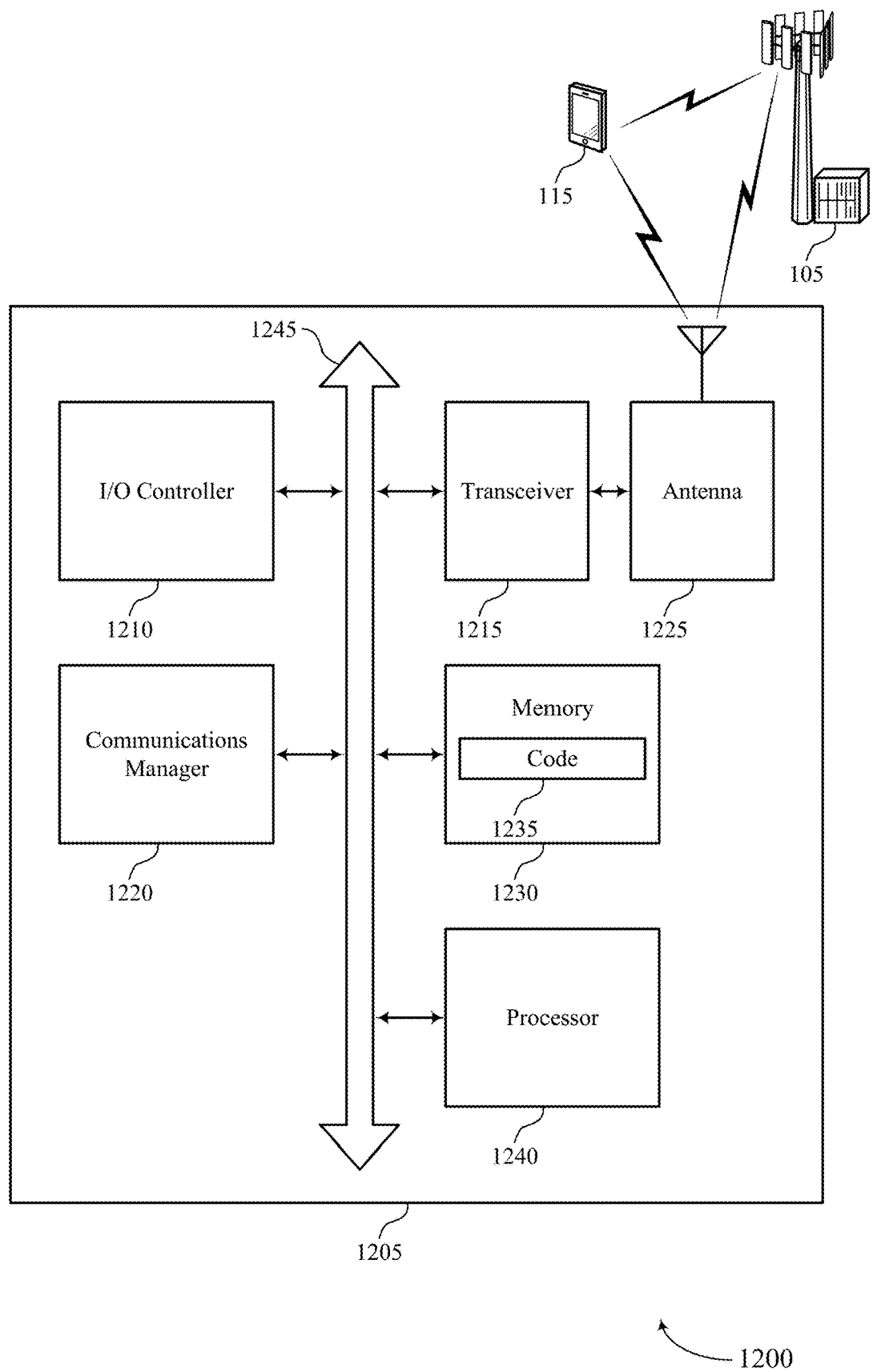
FIG. 12 shows a diagram of a system including a device that supports device region estimation for near-field operation in accordance with one or more aspects of the present disclosure.

FIG. 12 shows a diagram of a system 1200 including a device 1205 that supports device region estimation for near-field operation in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting device region estimation for near-field operation). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving reference signals from a first network entity on one or more beams at the UE. The communications manager 1220 may be configured as or otherwise support a means for performing one or more measurements on the reference signals. The communications manager 1220 may be configured as or otherwise support a means for determining a region in which the UE is located relative to the first network entity based on performing the one or more measurements. The communications manager 1220 may be configured as or otherwise support a means for selecting a beam for communicating with the first network entity based on the region in which the UE is located.

By including or configuring the communications manager 1220 in accordance with examples as described herein, the device 1205 may support techniques for reduced processing, reduced power consumption, and more efficient utilization of communication resources. Because the device 1205 may be able to determine whether the device 1205 is in a near-field region or a far-field region, beam management at the device 1205 may be improved, and the device 1205 may identify suitable beams for communicating with a network entity. As a result, the device 1205 may experience reduced distortion during communications with the network entity, resulting in the reduced processing, the reduced power consumption, and more efficient utilization of communication resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of device region estimation for near-field operation as described herein, or the processor 1240 and the memory 1230 may be otherwise configured to perform or support such operations.

Figure 13:
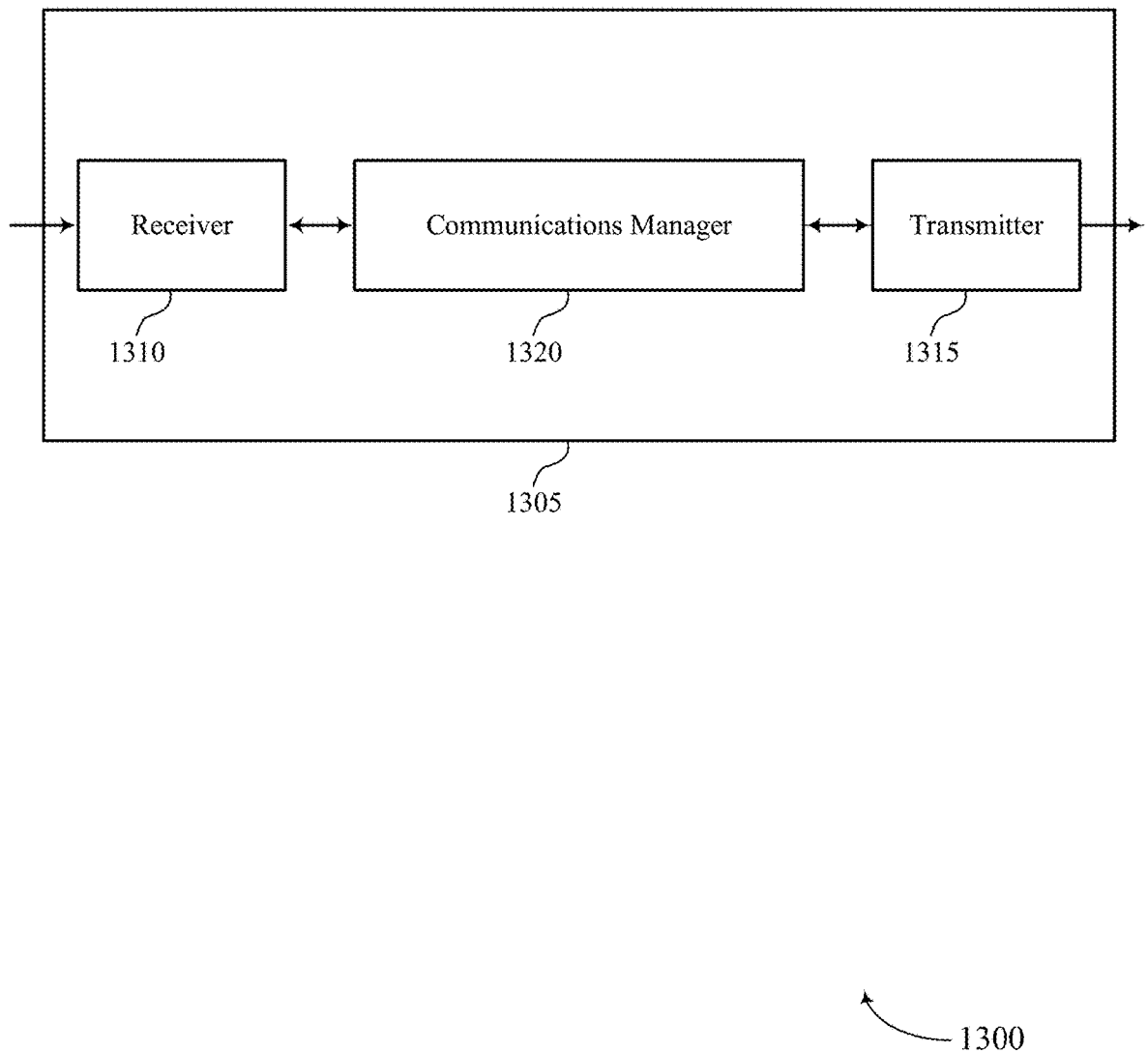
FIGS. 13 and 14 show block diagrams of devices that support device region estimation for near-field operation in accordance with one or more aspects of the present disclosure.

FIG. 13 shows a block diagram 1300 of a device 1305 that supports device region estimation for near-field operation in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include one or more processors, memory coupled with the one or more processors, and instructions stored in the memory that are executable by the one or more processors to enable the one or more processors to perform the beam management features discussed herein. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of device region estimation for near-field operation as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a first network entity in accordance with examples as disclosed herein. For example, the communications manager 1320 may be configured as or otherwise support a means for identifying an algorithm for correlating measurements performed by user equipment (UEs) with distances of the UEs from a second network entity. The communications manager 1320 may be configured as or otherwise support a means for receiving, from a UE, an indication of one or more measurements performed by the UE on reference signals received by the UE from the second network entity. The communications manager 1320 may be configured as or otherwise support a means for determining a region in which the UE is located relative to the second network entity using the one or more measurements received from the UE and the identified algorithm. The communications manager 1320 may be configured as or otherwise support a means for transmitting, to the UE, an indication of the region in which the UE is located relative to the second network entity based on the determining.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reduced processing, reduced power consumption, and more efficient utilization of communication resources. Because the device 1305 may be able to determine whether a UE 115 is in a near-field region or a far-field region, beam management at the device 1305 may be improved, and the device 1305 may identify suitable beams for communicating with the UE 115. As a result, the device 1305 may experience reduced distortion during communications with the UE 115, resulting in the reduced processing, the reduced power consumption, and more efficient utilization of communication resources.

Figure 14:
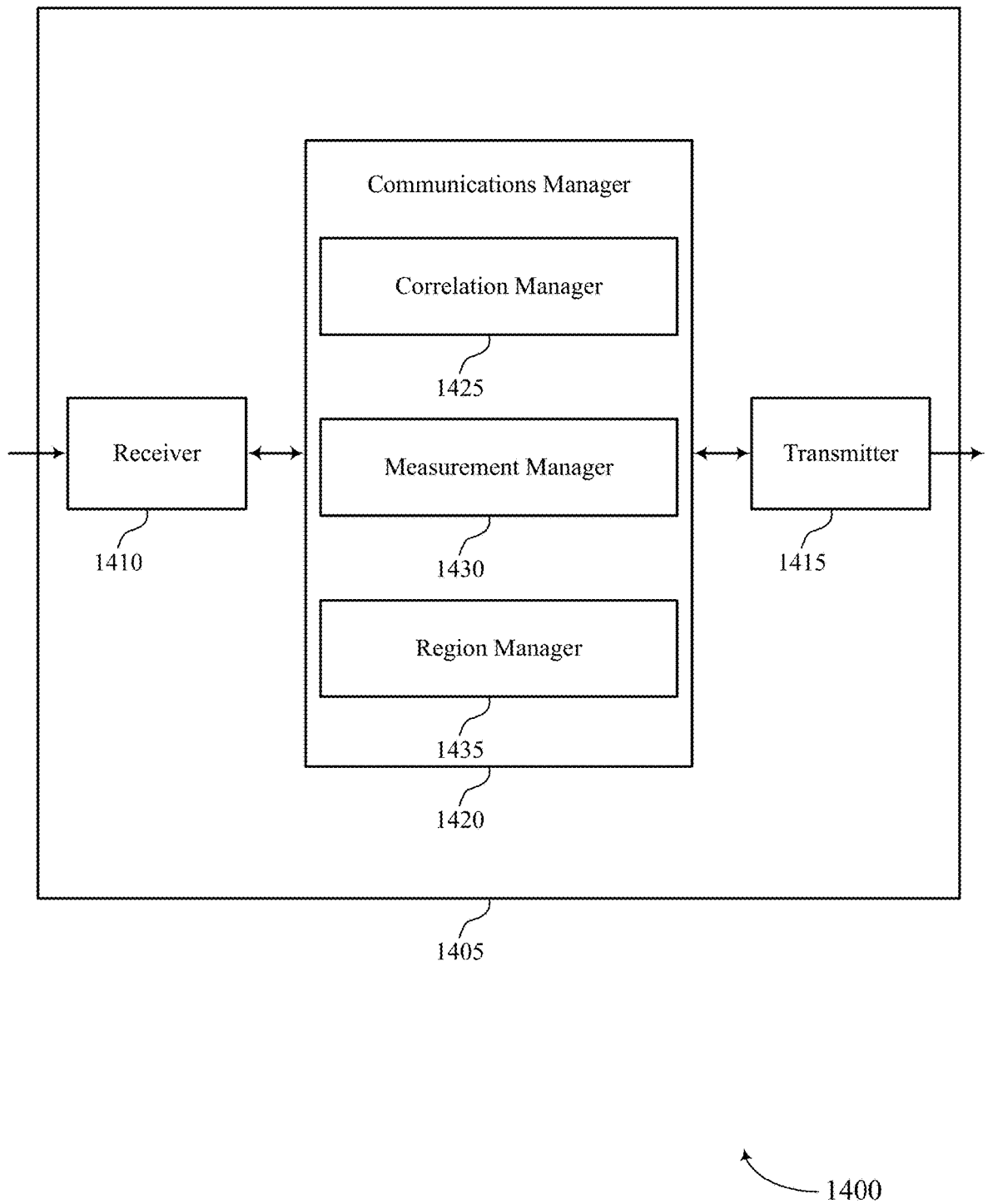

FIG. 14 shows a block diagram 1400 of a device 1405 that supports device region estimation for near-field operation in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of device region estimation for near-field operation as described herein. For example, the communications manager 1420 may include a correlation manager 1425, a measurement manager 1430, a region manager 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a first network entity in accordance with examples as disclosed herein. The correlation manager 1425 may be configured as or otherwise support a means for identifying an algorithm for correlating measurements performed by user equipment (UEs) with distances of the UEs from a second network entity. The measurement manager 1430 may be configured as or otherwise support a means for receiving, from a UE, an indication of one or more measurements performed by the UE on reference signals received by the UE from the second network entity. The region manager 1435 may be configured as or otherwise support a means for determining a region in which the UE is located relative to the second network entity using the one or more measurements received from the UE and the identified algorithm. The region manager 1435 may be configured as or otherwise support a means for transmitting, to the UE, an indication of the region in which the UE is located relative to the second network entity based on the determining.

In some cases, the correlation manager 1425, the measurement manager 1430, and the region manager 1435 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the correlation manager 1425, the measurement manager 1430, and the region manager 1435 discussed herein. A transceiver processor may be collocated with and/or communicate with (e.g., direct the operations of) a transceiver of the device. A radio processor may be collocated with and/or communicate with (e.g., direct the operations of) a radio (e.g., N NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 15:
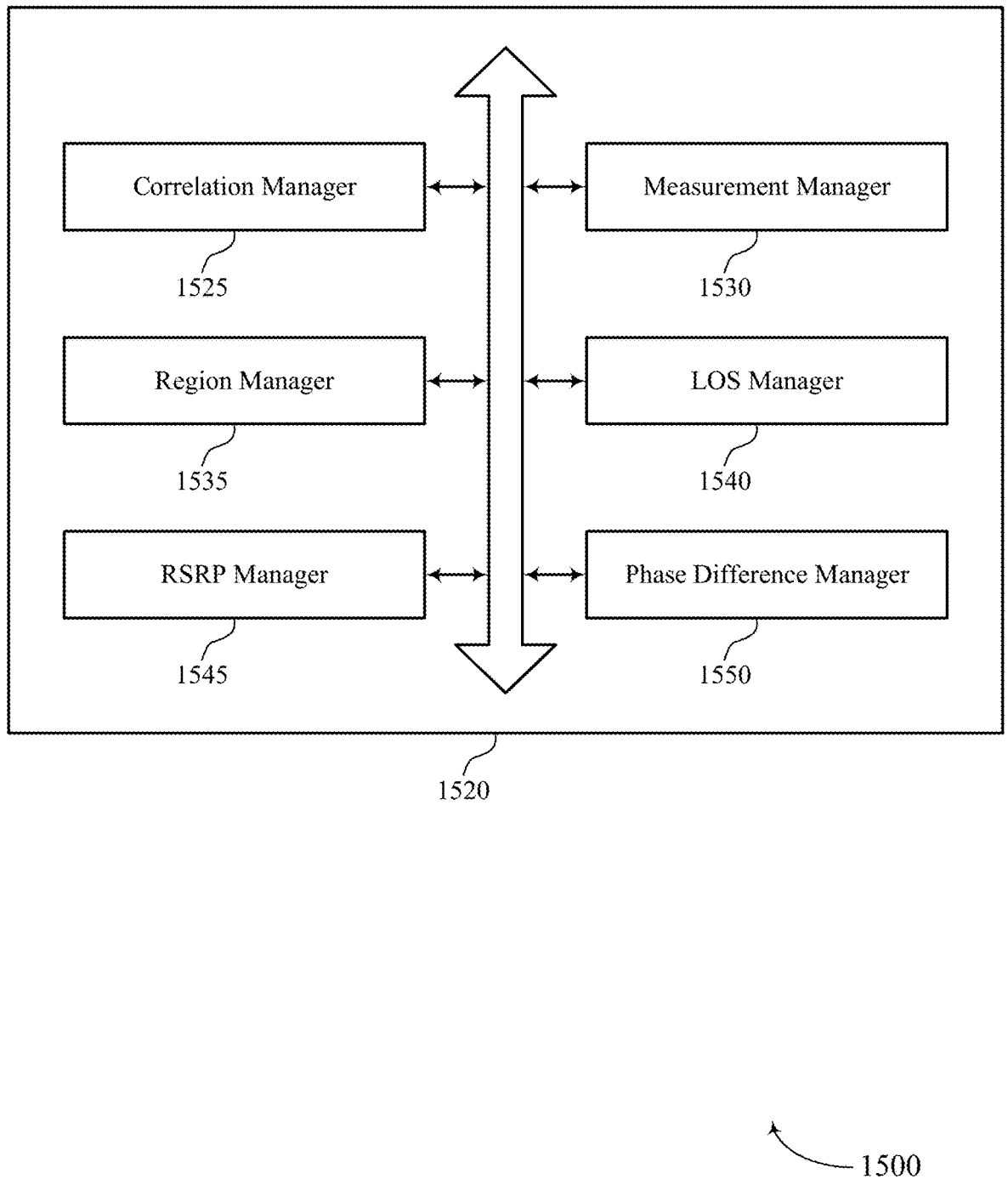
FIG. 15 shows a block diagram of a communications manager that supports device region estimation for near-field operation in accordance with one or more aspects of the present disclosure.

FIG. 15 shows a block diagram 1500 of a communications manager 1520 that supports device region estimation for near-field operation in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of device region estimation for near-field operation as described herein. For example, the communications manager 1520 may include a correlation manager 1525, a measurement manager 1530, a region manager 1535, a LOS manager 1540, an RSRP manager 1545, a phase difference manager 1550, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication at a first network entity in accordance with examples as disclosed herein. The correlation manager 1525 may be configured as or otherwise support a means for identifying an algorithm for correlating measurements performed by user equipment (UEs) with distances of the UEs from a second network entity. The measurement manager 1530 may be configured as or otherwise support a means for receiving, from a UE, an indication of one or more measurements performed by the UE on reference signals received by the UE from the second network entity. The region manager 1535 may be configured as or otherwise support a means for determining a region in which the UE is located relative to the second network entity using the one or more measurements received from the UE and the identified algorithm. In some examples, the region manager 1535 may be configured as or otherwise support a means for transmitting, to the UE, an indication of the region in which the UE is located relative to the second network entity based on the determining.

In some examples, to support receiving the indication of the one or more measurements from the UE, the measurement manager 1530 may be configured as or otherwise support a means for receiving, from the UE, an identifier of a beam associated with one or more highest signal strength measurements at the UE and an indication of the signal strength measurements, where transmitting the indication of the region in which the UE is located relative to the second network entity is based on receiving the identifier of the beam and the indication of the signal strength measurements.

In some examples, to support receiving the indication of the one or more measurements from the UE, the region manager 1535 may be configured as or otherwise support a means for receiving, from the UE, an indication of a location of the UE, where transmitting the indication of the region in which the UE is located relative to the second network entity is based on receiving the indication of the location of the UE.

In some examples, to support receiving the indication of the one or more measurements from the UE, the LOS manager 1540 may be configured as or otherwise support a means for receiving an indication of a quality of a line-of-sight path between the UE and the second network entity, where transmitting the indication of the region in which the UE is located relative to the second network entity is based on receiving the indication of the quality of the line-of-sight path.

In some examples, to support determining the region in which the UE is located relative to the second network entity, the RSRP manager 1545 may be configured as or otherwise support a means for determining the region in which the UE is located relative to the second network entity based on the reference signal received power measurements, the power with which the reference signals are transmitted from the power amplifier, an elemental gain at a transmit antenna element used at the second network entity to transmit the reference signals, a first quantity of antenna elements at a transmit antenna array at the second network entity, a second quantity of antenna elements at a receive antenna array at the UE, and an estimated path loss exponent for a communications link between the second network entity and the UE.

In some examples, to support determining the region in which the UE is located relative to the second network entity, the RSRP manager 1545 may be configured as or otherwise support a means for determining the region in which the UE is located relative to the second network entity based on the first reference signal received power measurements and the second reference signal received power measurements.

In some examples, the one or more measurements received from the UE includes a phase difference between a first set of the reference signals received by the UE and, to support transmitted by the second network entity using a second set of beam weights, and where determining the region in which the UE is located relative to the second network entity, the phase difference manager 1550 may be configured as or otherwise support a means for determining the region in which the UE is located relative to the second network entity based on the phase difference between the first set of the reference signals and the second set of the reference signals.

In some examples, the determining the region in which the UE is located relative to the second network entity is further based on parameters of a transmit antenna array at the second network entity used to transmit the first set of reference signals and the second set of reference signals.

In some examples, to support determining the region in which the UE is located relative to the second network entity, the region manager 1535 may be configured as or otherwise support a means for determining whether the UE is in a near-field region or a far-field region of the second network entity.

In some examples, the far-field region of the second network entity is a region beyond a Fraunhofer distance of the second network entity.

In some cases, the correlation manager 1525, the measurement manager 1530, the region manager 1535, the LOS manager 1540, the RSRP manager 1545, and the phase difference manager 1550 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the correlation manager 1525, the measurement manager 1530, the region manager 1535, the LOS manager 1540, the RSRP manager 1545, and the phase difference manager 1550 discussed herein.

Figure 16:
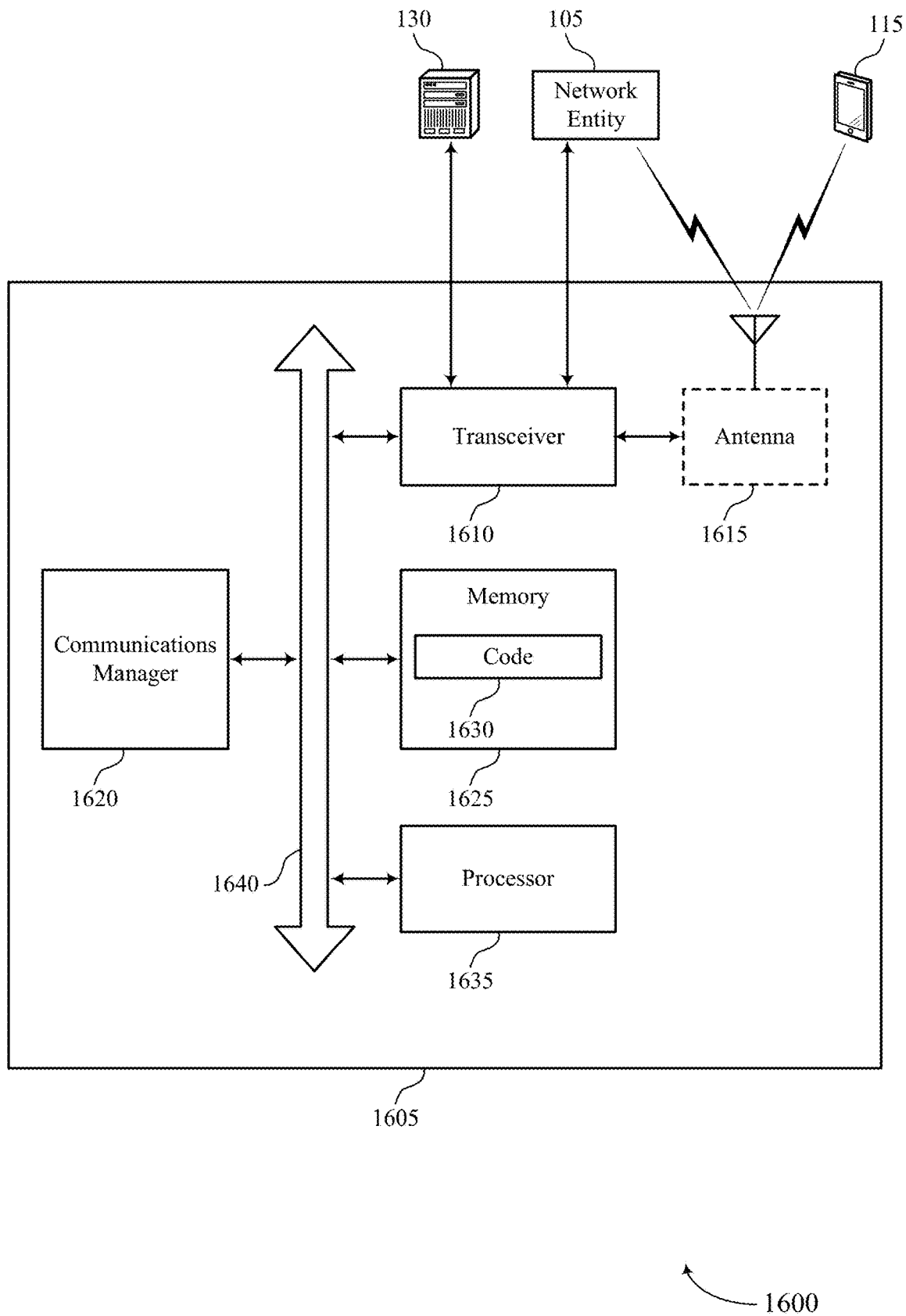
FIG. 16 shows a diagram of a system including a device that supports device region estimation for near-field operation in accordance with one or more aspects of the present disclosure.

FIG. 16 shows a diagram of a system 1600 including a device 1605 that supports device region estimation for near-field operation in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. The transceiver 1610, or the transceiver 1610 and one or more antennas 1615 or wired interfaces, where applicable, may be an example of a transmitter 1315, a transmitter 1415, a receiver 1310, a receiver 1410, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting device region estimation for near-field operation). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at a first network entity in accordance with examples as disclosed herein. For example, the communications manager 1620 may be configured as or otherwise support a means for identifying an algorithm for correlating measurements performed by user equipment (UEs) with distances of the UEs from a second network entity. The communications manager 1620 may be configured as or otherwise support a means for receiving, from a UE, an indication of one or more measurements performed by the UE on reference signals received by the UE from the second network entity. The communications manager 1620 may be configured as or otherwise support a means for determining a region in which the UE is located relative to the second network entity using the one or more measurements received from the UE and the identified algorithm. The communications manager 1620 may be configured as or otherwise support a means for transmitting, to the UE, an indication of the region in which the UE is located relative to the second network entity based on the determining.

By including or configuring the communications manager 1620 in accordance with examples as described herein, the device 1605 may support techniques for reduced processing, reduced power consumption, and more efficient utilization of communication resources. Because the device 1605 may be able to determine whether a UE 115 is in a near-field region or a far-field region, beam management at the device 1605 may be improved, and the device 1605 may identify suitable beams for communicating with the UE 115. As a result, the device 1605 may experience reduced distortion during communications with the UE 115, resulting in the reduced processing, the reduced power consumption, and more efficient utilization of communication resources.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the processor 1635, the memory 1625, the code 1630, the transceiver 1610, or any combination thereof. For example, the code 1630 may include instructions executable by the processor 1635 to cause the device 1605 to perform various aspects of device region estimation for near-field operation as described herein, or the processor 1635 and the memory 1625 may be otherwise configured to perform or support such operations.

Figure 17:
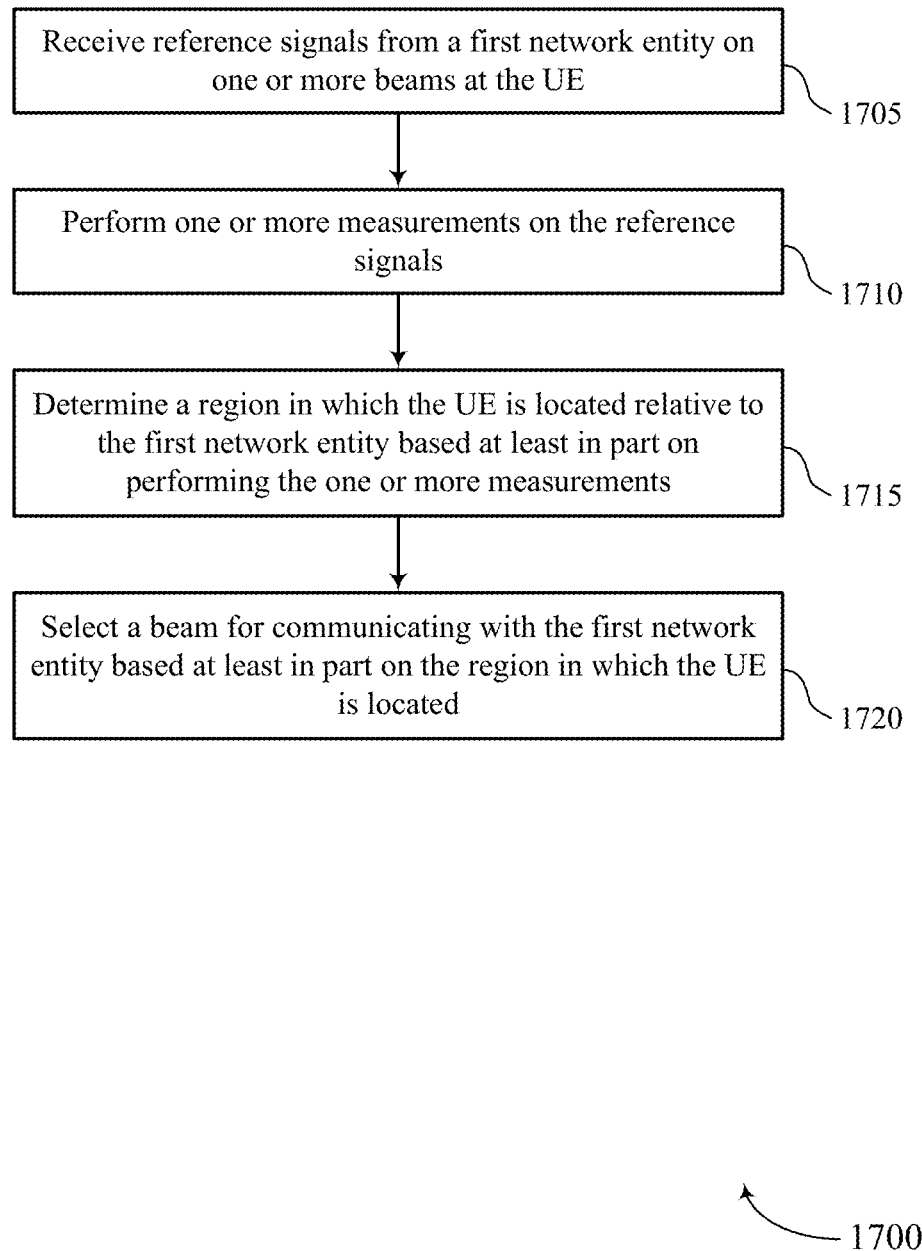
FIGS. 17 and 18 show flowcharts illustrating methods that support device region estimation for near-field operation in accordance with one or more aspects of the present disclosure.

FIG. 17 shows a flowchart illustrating a method 1700 that supports device region estimation for near-field operation in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving reference signals from a first network entity on one or more beams at the UE. The operations of 1705 may be performed in accordance with examples as disclosed herein. In some examples, aspects of the operations of 1705 may be performed by a reference signal manager 1125 as described with reference to FIG. 11.

At 1710, the method may include performing one or more measurements on the reference signals. The operations of 1710 may be performed in accordance with examples as disclosed herein. In some examples, aspects of the operations of 1710 may be performed by a measurement manager 1130 as described with reference to FIG. 11.

At 1715, the method may include determining a region in which the UE is located relative to the first network entity based on performing the one or more measurements. The operations of 1715 may be performed in accordance with examples as disclosed herein. In some examples, aspects of the operations of 1715 may be performed by a region manager 1135 as described with reference to FIG. 11.

At 1720, the method may include selecting a beam for communicating with the first network entity based on the region in which the UE is located. The operations of 1720 may be performed in accordance with examples as disclosed herein. In some examples, aspects of the operations of 1720 may be performed by a beam manager 1140 as described with reference to FIG. 11.

Figure 18:
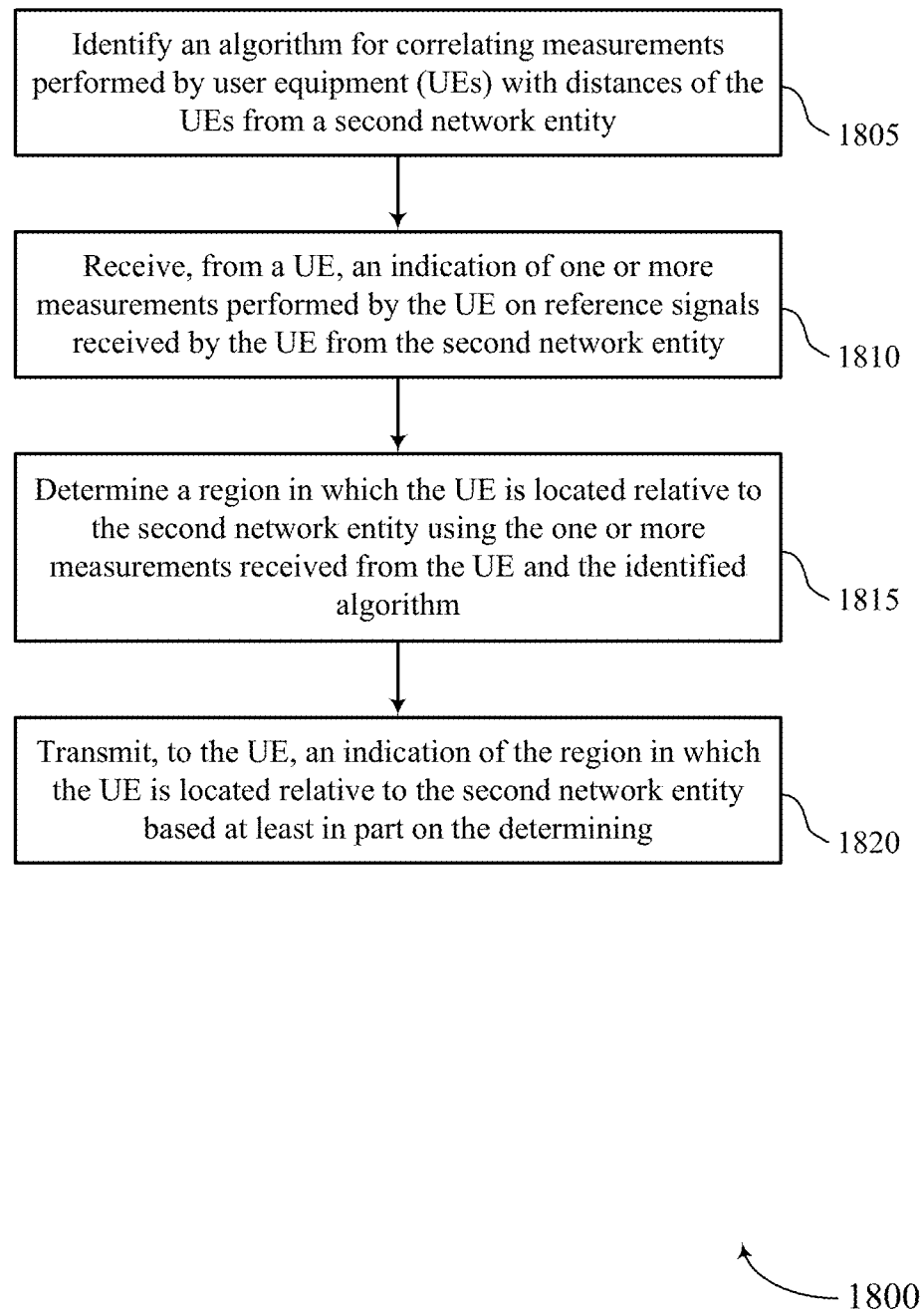

FIG. 18 shows a flowchart illustrating a method 1800 that supports device region estimation for near-field operation in accordance with one or more aspects of the present disclosure. The operations of the method 1800 may be implemented by a network entity or its components as described herein. For example, the operations of the method 1800 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1805, the method may include identifying an algorithm for correlating measurements performed by user equipment (UEs) with distances of the UEs from a second network entity. The operations of 1805 may be performed in accordance with examples as disclosed herein. In some examples, aspects of the operations of 1805 may be performed by a correlation manager 1525 as described with reference to FIG. 15.

At 1810, the method may include receiving, from a UE, an indication of one or more measurements performed by the UE on reference signals received by the UE from the second network entity. The operations of 1810 may be performed in accordance with examples as disclosed herein. In some examples, aspects of the operations of 1810 may be performed by a measurement manager 1530 as described with reference to FIG. 15.

At 1815, the method may include determining a region in which the UE is located relative to the second network entity using the one or more measurements received from the UE and the identified algorithm. The operations of 1815 may be performed in accordance with examples as disclosed herein. In some examples, aspects of the operations of 1815 may be performed by a region manager 1535 as described with reference to FIG. 15.

At 1820, the method may include transmitting, to the UE, an indication of the region in which the UE is located relative to the second network entity based on the determining. The operations of 1820 may be performed in accordance with examples as disclosed herein. In some examples, aspects of the operations of 1820 may be performed by a region manager 1535 as described with reference to FIG. 15.

The following provides an overview of aspects of the present disclosure:

Aspect 1: A method for wireless communication at a UE, comprising: receiving reference signals from a first network entity on one or more beams at the UE; performing one or more measurements on the reference signals; determining a region in which the UE is located relative to the first network entity based at least in part on performing the one or more measurements; and selecting a beam for communicating with the first network entity based at least in part on the region in which the UE is located.

Aspect 2: The method of aspect 1, further comprising: reporting, to a second network entity, the one or more measurements performed on the reference signals; and receiving, from the second network entity, an indication of the region in which the UE is located relative to the first network entity based at least in part on reporting the one or more measurements.

Aspect 3: The method of aspect 2, wherein reporting the one or more measurements comprises: reporting, to the second network entity, an identifier of a beam at the UE associated with one or more highest signal strength measurements and an indication of the signal strength measurements, wherein receiving the indication of the region in which the UE is located relative to the first network entity is based at least in part on reporting the identifier of the beam and the indication of the signal strength measurements.

Aspect 4: The method of any of aspects 2 through 3, wherein reporting the one or more measurements comprises: reporting, to the second network entity, a location of the UE, wherein receiving the indication of the region in which the UE is located relative to the first network entity is based at least in part on reporting the location of the UE.

Aspect 5: The method of any of aspects 2 through 4, wherein reporting the one or more measurements comprises: reporting, to the second network entity, a quality of a line-of-sight path between the UE and the first network entity, wherein receiving the indication of the region in which the UE is located relative to the first network entity is based at least in part on reporting the quality of the line-of-sight path.

Aspect 6: The method of aspect 5, further comprising: comparing a first signal strength of a first reference signal of the reference signals received from the first network entity and a second signal strength of a second reference signal of the reference signals received from the first network entity, the first reference signal having a first polarization and the second reference signal having a second polarization; and determining the quality of the line-of-sight path between the UE and the first network entity based at least in part on the comparing.

Aspect 7: The method of any of aspects 5 through 6, further comprising: comparing a first signal strength of a first polarization of a reference signal of the reference signals received from the first network entity and a second signal strength of a second polarization of the reference signal; and determining the quality of the line-of-sight path between the UE and the first network entity based at least in part on the comparing.

Aspect 8: The method of any of aspects 1 through 7, wherein performing the one or more measurements on the reference signals comprises: performing reference signal received power measurements on the reference signals received on a single beam at the UE, and wherein determining the region in which the UE is located relative to the first network entity comprises: determining the region in which the UE is located relative to the first network entity based at least in part on the reference signal received power measurements.

Aspect 9: The method of aspect 8, wherein determining the region in which the UE is located relative to the first network entity comprises: determining the region in which the UE is located relative to the first network entity based at least in part on the reference signal received power measurements, a power with which the reference signals are transmitted from a power amplifier, an elemental gain at a transmit antenna element used to transmit the reference signals, a first quantity of antenna elements at a transmit antenna array, a second quantity of antenna elements at a receive antenna array, and an estimated path loss exponent for a communications link between the first network entity and the UE.

Aspect 10: The method of any of aspects 8 through 9, wherein determining the region in which the UE is located relative to the first network entity comprises: reporting the reference signal received power measurements to a second network entity; and receiving, from the second network entity, an indication of the region in which the UE is located relative to the first network entity based at least in part on reporting the reference signal received power measurements.

Aspect 11: The method of any of aspects 1 through 10, wherein performing the one or more measurements on the reference signals comprises: performing first reference signal received power measurements on the reference signals received on a first beam at the UE and second reference signal received power measurements on the reference signals received on a second beam at the UE, and wherein determining the region in which the UE is located relative to the first network entity comprises: determining the region in which the UE is located relative to the first network entity based at least in part on the first reference signal received power measurements and the second reference signal received power measurements.

Aspect 12: The method of aspect 11, wherein determining the region in which the UE is located relative to the first network entity comprises: reporting the first reference signal received power measurements and the second reference signal received power measurements to a second network entity; and receiving, from the second network entity, an indication of the region in which the UE is located relative to the first network entity based at least in part on reporting the first and second reference signal received power measurements.

Aspect 13: The method of any of aspects 1 through 12, further comprising: receiving a first set of the reference signals from the first network entity using a first set of beam weights and a second set of the reference signals from the first network entity using a second set of beam weights; and determining the region in which the UE is located relative to the first network entity based at least in part on a phase difference between the first set of the reference signals and the second set of the reference signals.

Aspect 14: The method of aspect 13, further comprising: reporting, to a second network entity, the phase difference between the first set of the reference signals received using the first set of beam weights and the second set of the reference signals received using the second set of beam weights; and receiving, from the second network entity, an indication of the region in which the UE is located relative to the first network entity based at least in part on reporting the phase difference.

Aspect 15: The method of any of aspects 13 through 14, wherein the determining the region in which the UE is located relative to the first network entity is further based at least in part on parameters of a transmit antenna array at the first network entity used to transmit the first set of reference signals and the second set of reference signals.

Aspect 16: The method of any of aspects 1 through 15, wherein selecting the beam for communicating with the first network entity comprises: identifying an analog or hybrid beamforming codebook from which to select the beam for communicating with the first network entity based at least in part on the determined region in which the UE is located relative to the first network entity; and selecting the beam for communicating with the first network entity from the analog or hybrid beamforming codebook.

Aspect 17: The method of any of aspects 1 through 16, wherein determining the region in which the UE is located relative to the first network entity comprises: determining whether the UE is in a near-field region or a far-field region of the first network entity.

Aspect 18: The method of aspect 17, wherein the far-field region of the first network entity is a region beyond a Fraunhofer distance of the first network entity.

Aspect 19: A method for wireless communication at a first network entity, comprising: identifying an algorithm for correlating measurements performed by user equipment (UEs) with distances of the UEs from a second network entity; receiving, from a UE, an indication of one or more measurements performed by the UE on reference signals received by the UE from the second network entity; determining a region in which the UE is located relative to the second network entity using the one or more measurements received from the UE and the identified algorithm; and transmitting, to the UE, an indication of the region in which the UE is located relative to the second network entity based at least in part on the determining.

Aspect 20: The method of aspect 19, wherein receiving the indication of the one or more measurements from the UE comprises: receiving, from the UE, an identifier of a beam associated with one or more highest signal strength measurements at the UE and an indication of the signal strength measurements, wherein transmitting the indication of the region in which the UE is located relative to the second network entity is based at least in part on receiving the identifier of the beam and the indication of the signal strength measurements.

Aspect 21: The method of any of aspects 19 through 20, wherein receiving the indication of the one or more measurements from the UE comprises: receiving, from the UE, an indication of a location of the UE, wherein transmitting the indication of the region in which the UE is located relative to the second network entity is based at least in part on receiving the indication of the location of the UE.

Aspect 22: The method of any of aspects 19 through 21, wherein receiving the indication of the one or more measurements from the UE comprises: receiving an indication of a quality of a line-of-sight path between the UE and the second network entity, wherein transmitting the indication of the region in which the UE is located relative to the second network entity is based at least in part on receiving the indication of the quality of the line-of-sight path.

Aspect 23: The method of any of aspects 19 through 22, wherein the one or more measurements received from the UE comprises at least reference signal received power measurements and an indication of a power with which the reference signals are transmitted from a power amplifier, and wherein determining the region in which the UE is located relative to the second network entity comprises: determining the region in which the UE is located relative to the second network entity based at least in part on the reference signal received power measurements, the power with which the reference signals are transmitted from the power amplifier, an elemental gain at a transmit antenna element used at the second network entity to transmit the reference signals, a first quantity of antenna elements at a transmit antenna array at the second network entity, a second quantity of antenna elements at a receive antenna array at the UE, and an estimated path loss exponent for a communications link between the second network entity and the UE.

Aspect 24: The method of any of aspects 19 through 23, wherein the one or more measurements received from the UE comprises first reference signal received power measurements performed on reference signals received on a first beam at the UE and second reference signal received power measurements performed on reference signals received on a second beam at the UE, and wherein determining the region in which the UE is located relative to the second network entity comprises: determining the region in which the UE is located relative to the second network entity based at least in part on the first reference signal received power measurements and the second reference signal received power measurements.

Aspect 25: The method of any of aspects 19 through 24, wherein the one or more measurements received from the UE comprises a phase difference between a first set of the reference signals received by the UE and transmitted by the second network entity using a first set of beam weights and a second set of the reference signals received by the UE and transmitted by the second network entity using a second set of beam weights, and wherein determining the region in which the UE is located relative to the second network entity comprises: determining the region in which the UE is located relative to the second network entity based at least in part on the phase difference between the first set of the reference signals and the second set of the reference signals.

Aspect 26: The method of aspect 25, wherein the determining the region in which the UE is located relative to the second network entity is further based at least in part on parameters of a transmit antenna array at the second network entity used to transmit the first set of reference signals and the second set of reference signals.

Aspect 27: The method of any of aspects 19 through 26, wherein determining the region in which the UE is located relative to the second network entity comprises: determining whether the UE is in a near-field region or a far-field region of the second network entity.

Aspect 28: The method of aspect 27, wherein the far-field region of the second network entity is a region beyond a Fraunhofer distance of the second network entity.

Aspect 29: An apparatus for wireless communication at a UE, comprising a processor; memory coupled with the processor; and instructions stored in the memory and executable by the processor to cause the apparatus to perform a method of any of aspects 1 through 18.

Aspect 30: An apparatus for wireless communication at a UE, comprising at least one means for performing a method of any of aspects 1 through 18.

Aspect 31: A non-transitory computer-readable medium storing code for wireless communication at a UE, the code comprising instructions executable by a processor to perform a method of any of aspects 1 through 18.

Aspect 32: An apparatus for wireless communication at a first network entity, comprising a processor; memory coupled with the processor; and instructions stored in the memory and executable by the processor to cause the apparatus to perform a method of any of aspects 19 through 28.

Aspect 33: An apparatus for wireless communication at a first network entity, comprising at least one means for performing a method of any of aspects 19 through 28.

Aspect 34: A non-transitory computer-readable medium storing code for wireless communication at a first network entity, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving reference signals from a first network entity on one or more beams at the UE;
   performing one or more measurements on the reference signals;
   reporting, to a second network entity, the one or more measurements performed on the reference signals;
   determining a region in which the UE is located relative to the first network entity based at least in part on performing the one or more measurements, wherein determining the region comprises receiving, from the second network entity, an indication of the region in which the UE is located relative to the first network entity based at least in part on reporting the one or more measurements, and wherein determining the region in which the UE is located relative to the first network entity comprises determining that the UE is either in a near-field region of a coverage area of the first network entity or in a far-field region of the coverage area of the first network entity that is outside of the near-field region; and
   selecting a beam for communicating with the first network entity based at least in part on the determination that the UE is either in the near-field region or the far-field region of the coverage area of the first network entity.

2. The method of claim 1, wherein reporting the one or more measurements comprises:
   reporting, to the second network entity, an identifier of a beam at the UE associated with one or more highest signal strength measurements and an indication of the signal strength measurements, wherein receiving the indication of the region in which the UE is located relative to the first network entity is based at least in part on reporting the identifier of the beam and the indication of the signal strength measurements.

3. The method of claim 1, wherein reporting the one or more measurements comprises:
   reporting, to the second network entity, a location of the UE, wherein receiving the indication of the region in which the UE is located relative to the first network entity is based at least in part on reporting the location of the UE.

4. The method of claim 1, wherein reporting the one or more measurements comprises:
   reporting, to the second network entity, a quality of a line-of-sight path between the UE and the first network entity, wherein receiving the indication of the region in which the UE is located relative to the first network entity is based at least in part on reporting the quality of the line-of-sight path.

5. The method of claim 4, further comprising:
   comparing a first signal strength of a first reference signal of the reference signals received from the first network entity and a second signal strength of a second reference signal of the reference signals received from the first network entity, the first reference signal having a first polarization and the second reference signal having a second polarization; and
   determining the quality of the line-of-sight path between the UE and the first network entity based at least in part on the comparing.

6. The method of claim 4, further comprising:
   comparing a first signal strength of a first polarization of a reference signal of the reference signals received from the first network entity and a second signal strength of a second polarization of the reference signal; and
   determining the quality of the line-of-sight path between the UE and the first network entity based at least in part on the comparing.

7. The method of claim 1, wherein performing the one or more measurements on the reference signals comprises:
   performing reference signal received power measurements on the reference signals received on a single beam at the UE, and wherein determining the region in which the UE is located relative to the first network entity comprises:
   receiving the indication of the region that is determined based at least in part on the reference signal received power measurements.

8. The method of claim 7, wherein determining the region in which the UE is located relative to the first network entity comprises:
   receiving the indication of the region that is determined based at least in part on the reference signal received power measurements, a power with which the reference signals are transmitted from a power amplifier, an elemental gain at a transmit antenna element used to transmit the reference signals, a first quantity of antenna elements at a transmit antenna array, a second quantity of antenna elements at a receive antenna array, and an estimated path loss exponent for a communications link between the first network entity and the UE.

9. The method of claim 7, wherein reporting the one or more measurements comprises:
   reporting the reference signal received power measurements to the second network entity; and wherein determining the region in which the UE is located relative to the first network entity comprises receiving, from the second network entity, the indication of the region in which the UE is located relative to the first network entity based at least in part on reporting the reference signal received power measurements.

10. The method of claim 1, wherein performing the one or more measurements on the reference signals comprises:
performing first reference signal received power measurements on the reference signals received on a first beam at the UE and second reference signal received power measurements on the reference signals received on a second beam at the UE, and wherein determining the region in which the UE is located relative to the first network entity comprises:
receiving the indication of the region that is determined based at least in part on the first reference signal received power measurements and the second reference signal received power measurements.

11. The method of claim 10, wherein reporting the one or more measurements comprises:
reporting the first reference signal received power measurements and the second reference signal received power measurements to the second network entity; and
wherein determining the region in which the UE is located relative to the first network entity comprises receiving, from the second network entity, the indication of the region in which the UE is located relative to the first network entity based at least in part on reporting the first and second reference signal received power measurements.

12. The method of claim 1, further comprising:
receiving a first set of the reference signals from the first network entity using a first set of beam weights and a second set of the reference signals from the first network entity using a second set of beam weights; and
determining the region in which the UE is located relative to the first network entity based at least in part on a phase difference between the first set of the reference signals and the second set of the reference signals.

13. The method of claim 12, wherein reporting the one or more measurements comprises:
reporting, to the second network entity, the phase difference between the first set of the reference signals received using the first set of beam weights and the second set of the reference signals received using the second set of beam weights; and
wherein determining the region in which the UE is located relative to the first network entity comprises receiving, from the second network entity, the indication of the region in which the UE is located relative to the first network entity based at least in part on reporting the phase difference.

14. The method of claim 12, wherein the determining the region in which the UE is located relative to the first network entity is further based at least in part on parameters of a transmit antenna array at the first network entity used to transmit the first set of reference signals and the second set of reference signals.

15. The method of claim 1, wherein selecting the beam for communicating with the first network entity comprises:
identifying an analog or hybrid beamforming codebook from which to select the beam for communicating with the first network entity based at least in part on the determined region in which the UE is located relative to the first network entity; and
selecting the beam for communicating with the first network entity from the analog or hybrid beamforming codebook.

16. The method of claim 1, wherein the far-field region of the first network entity is a region beyond a Fraunhofer distance of the first network entity.

17. An apparatus for wireless communication at a user equipment (UE), comprising:
one or more processors;
memory coupled with the one or more processors; and
instructions stored in the memory and executable by the one or more processors to cause the apparatus to:
receive reference signals from a first network entity on one or more beams at the UE;
perform one or more measurements on the reference signals;
report, to a second network entity, the one or more measurements performed on the reference signals;
determine a region in which the UE is located relative to the first network entity based at least in part on performing the one or more measurements, wherein the one or more processors are configured to cause the apparatus to determine the region in which the UE is located relative to the first network entity by being configured to cause the apparatus to receive, from the second network entity, an indication of the region in which the UE is located relative to the first network entity based at least in part on the one or more reported measurements, and wherein the one or more processors are configured to cause the apparatus to determine the region in which the UE is located relative to the first network entity by being configured to cause the apparatus to determine that the UE is either in a near-field region of a coverage area of the first network entity or in a far-field region of the coverage area of the first network entity that is outside of the near-field region; and
select a beam for communicating with the first network entity based at least in part on the determination that the UE is either in the near-field region or the far-field region of the coverage area of the first network entity.

18. An apparatus for wireless communication at a user equipment (UE), comprising:
one or more processors;
memory coupled with the one or more processors; and
instructions stored in the memory and executable by the one or more processors to cause the apparatus to:
receive reference signals from a first network entity on one or more beams at the UE;
perform one or more measurements on the reference signals, wherein the one or more processors are configured to cause the apparatus to perform the one or more measurements on the reference signals by being configured to cause the apparatus to perform first reference signal received power measurements on the reference signals received on a first beam at the UE and second reference signal received power measurements on the reference signals received on a second beam at the UE;
determine a region in which the UE is located relative to the first network entity based at least in part on performing the one or more measurements, wherein the one or more processors are configured to cause the apparatus to determine the region in which the UE is located relative to the first network entity by being configured to cause the apparatus to determine the region in which the UE is located relative to the first network entity based at least in part on the first reference signal received power measurements and the second reference signal received power measurements, and wherein the one or more processors are configured to cause the apparatus to determine the region in which the UE is located relative to the first network entity by being configured to cause the apparatus to determine that the UE is either in a near-field region of a coverage area of the first network entity or in a far-field region of the coverage area of the first network entity that is outside of the near-field region; and select a beam for communicating with the first network entity based at least in part on the determination that the UE is either in the near-field region or the far-field region of the coverage area of the first network entity.

19. The method of claim 18, wherein the one or more processors are configured to cause the apparatus to determine the region in which the UE is located relative to the first network entity by being configured to cause the apparatus to:

report the first reference signal received power measurements and the second reference signal received power measurements to a second network entity; and receive, from the second network entity, an indication of the region in which the UE is located relative to the first network entity based at least in part on the reported first and second reference signal received power measurements.

20. An apparatus for wireless communication at a user equipment (UE), comprising:

one or more processors;

memory coupled with the one or more processors; and instructions stored in the memory and executable by the one or more processors to cause the apparatus to:

receive reference signals from a first network entity on one or more beams at the UE, wherein the one or more processors are configured to cause the apparatus to receive the reference signals by being configured to cause the apparatus to receive a first set of the reference signals from the first network entity using a first set of beam weights and a second set of the reference signals from the first network entity using a second set of beam weights;

perform one or more measurements on the reference signals;

determine a region in which the UE is located relative to the first network entity based at least in part on performing the one or more measurements, wherein the one or more processors are configured to cause the apparatus to determine the region in which the UE is located relative to the first network entity based at least in part on a phase difference between the first set of the reference signals and the second set of the reference signals, and wherein the one or more processors are configured to cause the apparatus to determine the region in which the UE is located relative to the first network entity by being configured to cause the apparatus to determine that the UE is either in a near-field region of a coverage area of the first network entity or in a far-field region of the coverage area of the first network entity that is outside of the near-field region; and select a beam for communicating with the first network entity based at least in part on the determination that the UE is either in the near-field region or the far-field region of the coverage area of the first network entity.

21. The method of claim 20, wherein the one or more processors are further configured to cause the apparatus to:

report, to a second network entity, the phase difference between the first set of the reference signals received using the first set of beam weights and the second set of the reference signals received using the second set of beam weights; and receive, from the second network entity, an indication of the region in which the UE is located relative to the first network entity based at least in part on reporting the phase difference.

22. The method of claim 20, wherein the one or more processors are configured to cause the apparatus to determine the region in which the UE is located relative to the first network entity based at least in part on parameters of a transmit antenna array at the first network entity used to transmit the first set of reference signals and the second set of reference signals.

23. An apparatus for wireless communication at a user equipment (UE), comprising:

one or more processors;

memory coupled with the one or more processors; and instructions stored in the memory and executable by the one or more processors to cause the apparatus to:

receive reference signals from a first network entity on one or more beams at the UE;

perform one or more measurements on the reference signals;

determine a region in which the UE is located relative to the first network entity based at least in part on performing the one or more measurements, wherein the one or more processors are configured to cause the apparatus to determine the region in which the UE is located relative to the first network entity by being configured to cause the apparatus to determine that the UE is either in a near-field region of a coverage area of the first network entity or in a far-field region of the coverage area of the first network entity that is outside of the near-field region; and select a beam for communicating with the first network entity based at least in part on the determination that the UE is either in the near-field region or the far-field region of the coverage area of the first network entity, wherein the one or more processors are configured to cause the apparatus to select the beam for communicating with the first network entity by being configured to cause the apparatus to:

identify an analog or hybrid beamforming codebook from which to select the beam for communicating with the first network entity based at least in part on the determined region in which the UE is located relative to the first network entity; and select the beam for communicating with the first network entity from the analog or hybrid beamforming codebook.

* * * * *